US012665936B2

(12) United States Patent
Fei

(10) Patent No.: US 12,665,936 B2
(45) Date of Patent: Jun. 23, 2026

(54) DATA TRANSMISSION USING CONNECTION-LESS AND CONNECTION-ORIENTED TRANSMISSION LAYER PROTOCOLS

(71) Applicant: Tencent Technology (Shenzhen) Company Limited, Shenzhen (CN)

(72) Inventor: Wei Fei, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 18/664,856

(22) Filed: May 15, 2024

(65) Prior Publication Data

US 2024/0305674 A1 Sep. 12, 2024

Related U.S. Application Data

(63) Continuation of application No. PCT/CN2023/097116, filed on May 30, 2023.

(30) Foreign Application Priority Data

Aug. 9, 2022 (CN) .......................... 202210958709.7

(51) Int. Cl.
*H04L 65/1069* (2022.01)
*H04L 43/0811* (2022.01)
(Continued)

(52) U.S. Cl.
CPC ...... *H04L 65/1069* (2013.01); *H04L 65/1108* (2022.05); *H04L 67/141* (2013.01)

(58) Field of Classification Search
CPC . H04L 65/1069; H04L 65/1108; H04L 65/80; H04L 67/141; H04L 43/0811; H04L 69/165
See application file for complete search history.

(56) References Cited

U.S. PATENT DOCUMENTS

| 10,735,476 B1 | 8/2020 | VanderKnyff et al. |
| 2009/0089440 A1 | 4/2009 | Gathman |

(Continued)

FOREIGN PATENT DOCUMENTS

| CN | 104486243 A | 4/2015 |
| CN | 106161179 A | 11/2016 |

(Continued)

OTHER PUBLICATIONS

Fosser et al., "Quality of Experience of WebRTC based video communication," Master of Science in Communication Technology Supervisor: Min Xie, ITEM Co-supervisor: Doreid Ammar, ITEM (Year: 2017).*

(Continued)

*Primary Examiner* — Alina A Boutah
(74) *Attorney, Agent, or Firm* — Banner & Witcoff, Ltd.

(57) ABSTRACT

A data transmission method is provided, including: generating session offers of a communication session, and sending the session offers to a destination end based on a connectionless-oriented transmission layer protocol and a connection-oriented transmission layer protocol respectively; determining, based on transmission statuses of session answers fed back by the destination end for the session offers, respective connectivity detection results of a connectionless transmission channel and a connection transmission channel of the communication session; establishing a data transmission channel to the destination end based on the connectivity detection results; and transmitting session data of the communication session with the destination end through the data transmission channel.

20 Claims, 7 Drawing Sheets

(51) Int. Cl.

| | | |
|---|---|---|
| *H04L 65/1108* | (2022.01) | |
| *H04L 67/141* | (2022.01) | |
| *H04L 69/165* | (2022.01) | |

(56) References Cited

U.S. PATENT DOCUMENTS

| | | | |
|---|---|---|---|
| 2011/0040883 A1* | 2/2011 | Belling .............. | H04L 65/1104 709/228 |
| 2012/0331032 A1* | 12/2012 | Balachandran ....... | H04L 69/164 709/202 |
| 2016/0285948 A1* | 9/2016 | Saint-Hilaire ........ | G06F 16/958 |
| 2017/0124664 A1* | 5/2017 | Savenok ................ | G06Q 50/01 |
| 2018/0316732 A1* | 11/2018 | Belling ................... | H04L 65/65 |
| 2019/0158863 A1* | 5/2019 | Mory ...................... | H04L 65/80 |
| 2020/0336567 A1 | 10/2020 | Dumaine | |

FOREIGN PATENT DOCUMENTS

| | | |
|---|---|---|
| CN | 106310656 A | 1/2017 |
| CN | 109274634 A | 1/2019 |
| CN | 109361551 A | 2/2019 |
| CN | 111654856 A | 9/2020 |
| CN | 112039775 A | 12/2020 |
| CN | 112101590 A | 12/2020 |
| CN | 113315823 A | 8/2021 |
| CN | 113630439 A | 11/2021 |
| CN | 113973124 A | 1/2022 |
| CN | 114257662 A | 3/2022 |
| EP | 1 049 298 B1 | 8/2013 |
| EP | 3 236 656 A1 | 10/2017 |
| WO | WO-2019010042 A1 * | 1/2019 ............. H04L 65/80 |

OTHER PUBLICATIONS

European Patent Office (EPO) Search Report for EP23851330.3-1206, dated Oct. 2, 2025.

Sep. 13, 2023—(WO) Search Report—App PCT/CN2023/097116.

Apr. 29, 2026—CN Notice of First Review Opinion—Application No. 202210958709.7.

* cited by examiner

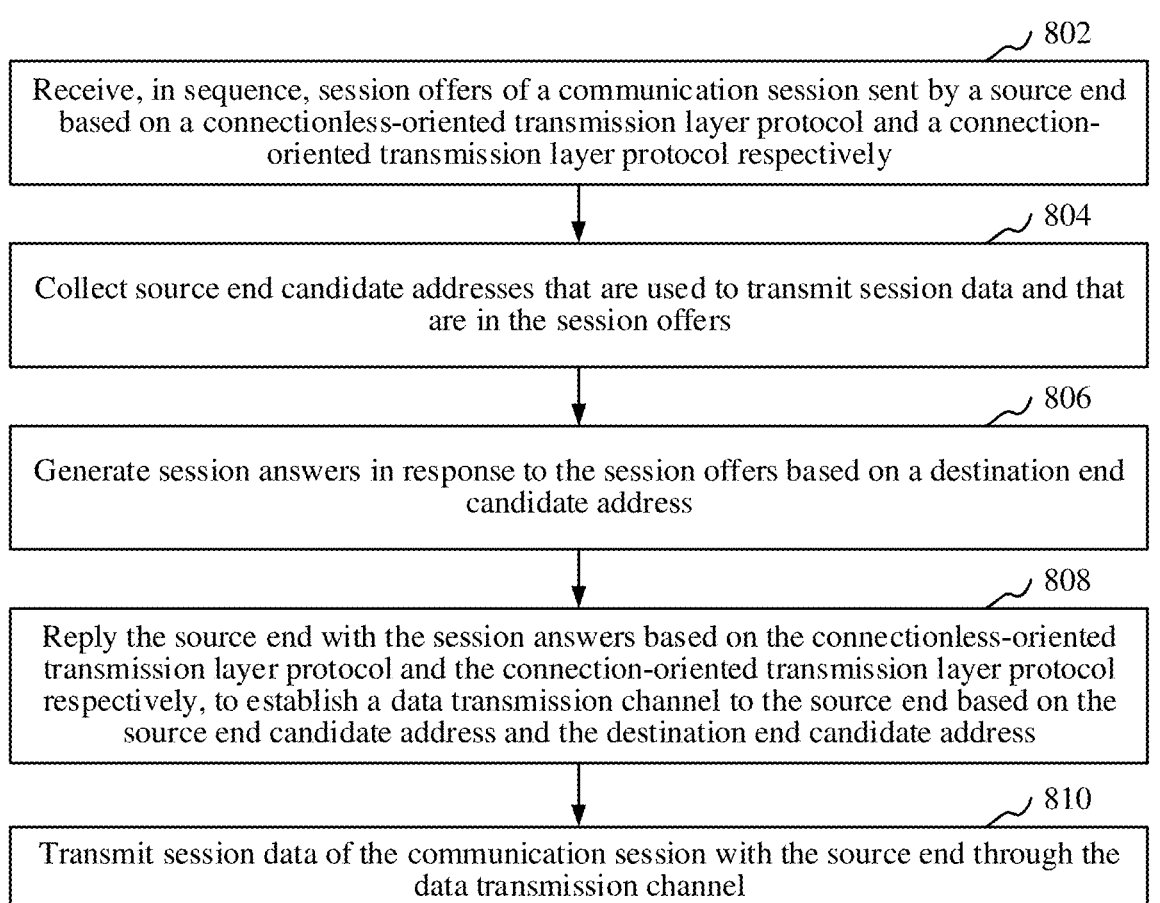

_802

Receive, in sequence, session offers of a communication session sent by a source end based on a connectionless-oriented transmission layer protocol and a connection-oriented transmission layer protocol respectively

_804

Collect source end candidate addresses that are used to transmit session data and that are in the session offers

_806

Generate session answers in response to the session offers based on a destination end candidate address

_808

Reply the source end with the session answers based on the connectionless-oriented transmission layer protocol and the connection-oriented transmission layer protocol respectively, to establish a data transmission channel to the source end based on the source end candidate address and the destination end candidate address

_810

Transmit session data of the communication session with the source end through the data transmission channel

FIG. 8

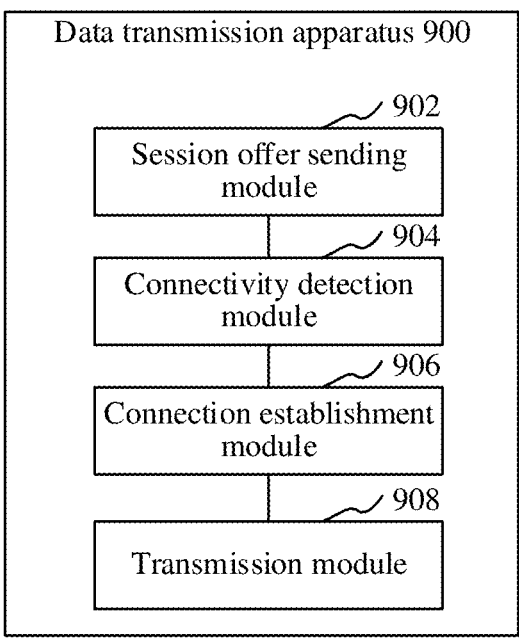

Data transmission apparatus 900

_902

Session offer sending module

_904

Connectivity detection module

_906

Connection establishment module

_908

Transmission module

FIG. 9

DATA TRANSMISSION USING CONNECTION-LESS AND CONNECTION-ORIENTED TRANSMISSION LAYER PROTOCOLS

RELATED APPLICATION

This application is a continuation of PCT/CN2023/097116, filed on May 30, 2023, which claims priority to Chinese Patent Application No. 202210958709.7, filed with the Chinese Patent Office on Aug. 9, 2022 and entitled "DATA TRANSMISSION METHOD, APPARATUS, DEVICE, STORAGE MEDIUM, AND COMPUTER PROGRAM PRODUCT", which are incorporated herein by reference in their entirety.

TECHNICAL FIELD

Aspects described herein relate to the field of computer technologies, and in particular, to a data transmission method and apparatus, a computer device, a storage medium, and a computer program product.

BACKGROUND

A web real-time communication (WebRTC) technology is a real-time communication technology that may be used in real-time audio and video communication, such as pulling audio and video streams. A user datagram protocol (UDP) is a connectionless-oriented transmission layer communication protocol, has advantages of fast transmission, high efficiency, and a low delay, and also has disadvantages of unreliability and weak network penetration. A transmission control protocol (TCP) is a connection-oriented, reliable, and byte stream-based transmission layer communication protocol, has advantages of reliable transmission and strong network penetration, and also has disadvantages of slow transmission, low efficiency, and a high delay.

The WebRTC typically requires two types of interactions over a network: signaling interaction and data transmission. Based on characteristics of the UDP and the TCP, the WebRTC standard generally uses a TCP-based transmission protocol to implement the signaling interaction, and uses a UDP-based transmission protocol to transmit data. However, the UDP is restricted in many scenarios and to some network environments. For example, the UDP may be limited in speed or restricted directly by different operators in different regions. For another example, the UDP is even directly prohibited under a security policy of some internal networks. This significantly affects WebRTC-based data transmission.

Currently, a countermeasure is to switch to another protocol for transmitting audio or video when a wait time expires. However, this method often produces a poor experience, requires a waiting process, may take an excessively long time, and may have a large data transmission delay. This might not applicable to a low-delay transmission scenario.

SUMMARY

Aspects described herein provide a data transmission method, executed by a computer device, and may include the following operations:

generating session offers of a communication session, and sending the session offers to a destination end based on a connectionless-oriented transmission layer protocol and a connection-oriented transmission layer protocol respectively;

determining, based on transmission statuses of session answers fed back by the destination end for the session offers, respective connectivity detection results of a connectionless transmission channel and a connection transmission channel of the communication session;

establishing a data transmission channel to the destination end based on the connectivity detection results; and transmitting session data of the communication session with the destination end through the data transmission channel.

Aspects further provide a data transmission apparatus, and the apparatus includes:

a session offer sending module, configured to: generate session offers of a communication session, and send the session offers to a destination end based on a connectionless-oriented transmission layer protocol and a connection-oriented transmission layer protocol respectively;

a connectivity detection module, configured to: determine, based on transmission statuses of session answers fed back by the destination end for the session offers, respective connectivity detection results of a connectionless transmission channel and a connection transmission channel of the communication session;

a connection establishment module, configured to: establish a data transmission channel to the destination end based on the connectivity detection results; and a transmission module, configured to transmit session data of the communication session with the destination end through the data transmission channel.

This application further provides a computer device. The computer device includes a memory and a processor. The memory stores computer-readable instructions. When the computer-readable instructions are executed by the processor, operations of the data transmission method may be implemented.

Aspects described herein further provide a computer-readable storage medium. The computer-readable storage medium has computer-readable instructions stored therein. When the computer-readable instructions are executed by a processor, operations of the data transmission method may be implemented.

Aspects described herein further provide a computer program product. The computer program product includes computer-readable instructions. When the computer-readable instructions are executed by a processor, operations of the data transmission method may be implemented.

Aspects described herein further provide a data transmission method, executed by a computer device, and the method may include the following operations:

receiving, in sequence, session offers of a communication session transmitted by a source end based on a connectionless-oriented transmission layer protocol and a connection-oriented transmission layer protocol respectively;

collecting source end candidate addresses that are used to transmit session data and that are in the session offers;

generating session answers in response to the session offers based on destination end candidate addresses;

replying the source end with the session answers based on the connectionless-oriented transmission layer protocol and the connection-oriented transmission layer protocol respectively, and establishing a data transmission channel to the source end based on the source end candidate address and the destination end candidate address; and transmitting session data of the communication session with the source end through the data transmission channel.

According to additional aspects, a data transmission apparatus is provided, which may include:

a session offer receiving module, configured to: receive, in sequence, session offers of a communication session transmitted by a source end based on a connectionless-oriented transmission layer protocol and a connection-oriented transmission layer protocol respectively;

a source end address adding module, configured to collect source end candidate addresses that are used to transmit session data and that are in the session offers;

a session answer generation module, configured to generate session answers in response to the session offers based on destination end candidate addresses;

a session answer sending module, configured to: reply the source end with the session answers based on the connectionless-oriented transmission layer protocol and the connection-oriented transmission layer protocol respectively, and establish a data transmission channel to the source end based on the source end candidate address and the destination end candidate address; and a transmission module, configured to transmit session data of the communication session with the source end through the data transmission channel.

Aspects described herein further provide a computer device. The computer device includes a memory and a processor. The memory stores computer-readable instructions. When the computer-readable instructions are executed by the processor, operations of the data transmission method may be implemented.

Aspects described herein further provide a computer-readable storage medium. The computer-readable storage medium has computer-readable instructions stored therein. When the computer-readable instructions are executed by a processor, operations of the data transmission method may be implemented.

Aspects described herein further provide a computer program product. The computer program product includes computer-readable instructions. When the computer-readable instructions are executed by a processor, operations of the data transmission method may be implemented.

Various aspects are described in the accompanying drawings and the description below.

BRIEF DESCRIPTION OF THE DRAWINGS

To describe the various aspects of the disclosure more clearly, the following briefly introduces the accompanying drawings used to describe the various aspects. The drawings only show some illustrative examples, and a person of ordinary skill in the art may still derive other drawings based on the accompanying drawings without creative efforts.

FIG. 8 is a schematic flowchart of an example data transmission method according to one or more aspects described herein.

FIG. 9 is a structural block diagram of an example data transmission apparatus according to one or more aspects described herein.

DETAILED DESCRIPTION

To make the objectives, technical solutions, and advantages of this disclosure clearer, the following further describes aspects of the disclosure in detail with reference to the accompanying drawings. Specific examples described herein are merely used to explain various aspects of the disclosure but are not intended to be limiting.

Concepts are explained and described below.

WebRTC: Web Real-Time Communication, a real-time communication technology that may be used in real-time audio and video communication, such as pulling audio and video streams. In a client, the real-time communication may be introduced based on the WebRTC.

RTT: Round-Trip Time, round-trip time, which may be an important performance indicator.

SDP: Session Description Protocol, a session description protocol.

ICE: Interactive Connectivity Establishment, an interactive connectivity establishment.

UDP: User Datagram Protocol, user datagram protocol, a connectionless transmission layer protocol that may provide a simple and unreliable transaction-oriented messaging service.

TCP: Transmission Control Protocol, transmission control protocol, a connection-oriented, reliable, and byte stream-based transmission layer communication protocol.

DTLS: Datagram Transport Layer Security, a UDP-oriented data transport layer security protocol.

TLS: Transport Layer Security, a TCP-oriented data transport layer security protocol.

MTU: Maximum Transmission Unit, a maximum transmission unit.

QOS: Quality of Service, a service quality indicator.

Figure 1:
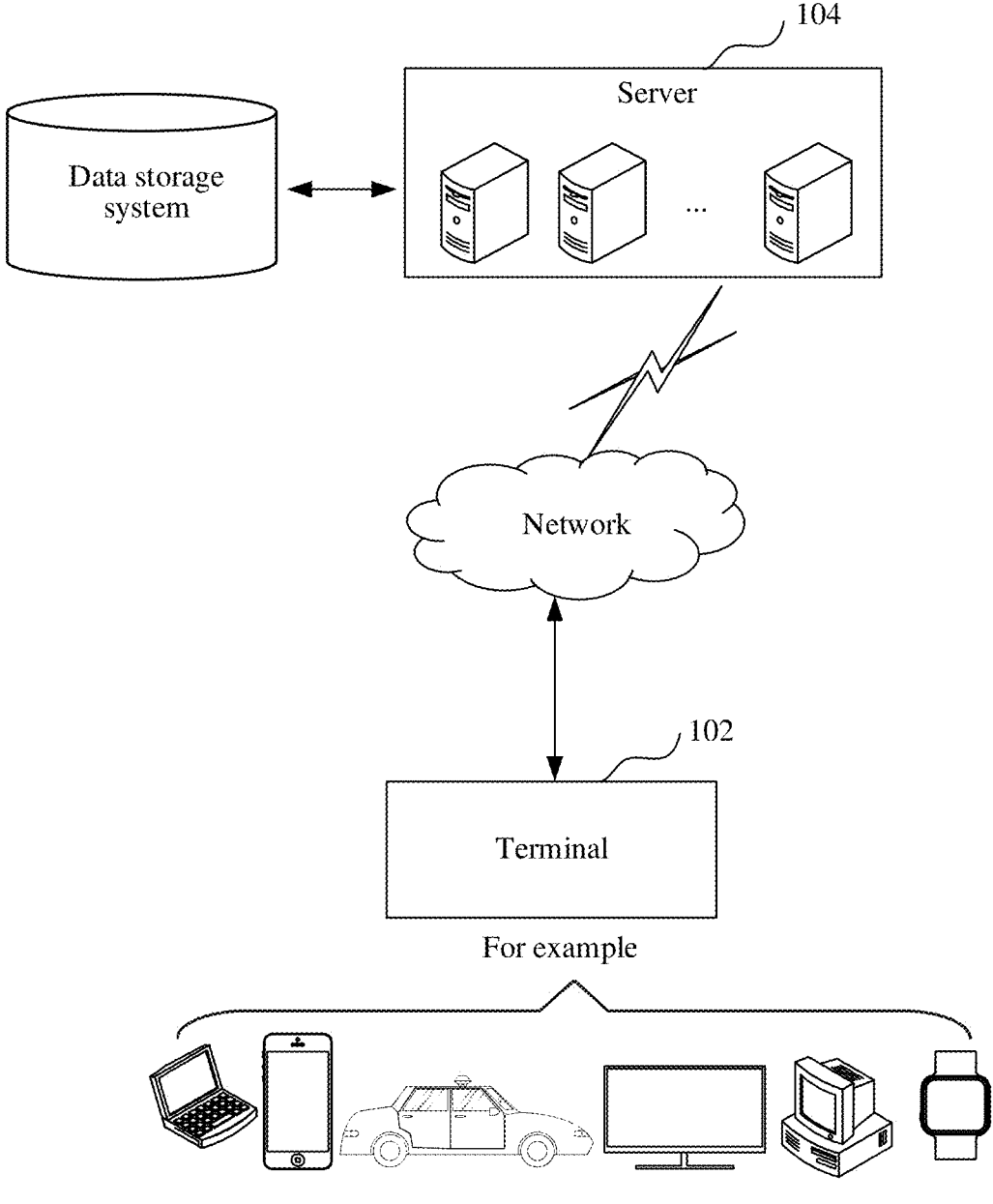
FIG. 1 is an application environment diagram of a data transmission method according to one or more aspects described herein.

A data transmission method described herein may be applied to the example application environment shown in FIG. 1. A terminal 102 communicates with a server 104 by using a network. A data storage system may store data that the server 104 needs to process. The data storage system may be integrated on the server 104, or placed on a cloud or another server. In one example, a client may run on the terminal 102. The client may be an instant communication client, a live video client, or the like. The client, serving as a source end, may generate session offers of a communication session; send, based on a connectionless-oriented transmission layer protocol and a connection-oriented transmission layer protocol respectively, the session offers to the server 104 in which a destination end is located; determine, based on transmission statuses of session answers fed back by the server 104 in which the destination end is located for the session offer, respective connectivity detection results of a connectionless transmission channel and a connection transmission channel of the communication session; then, establish a data transmission channel to the destination end based on the connectivity detection results; and transmit session data of the communication session with the server 104 in which the destination end is located through the data transmission channel.

The terminal 102 may be any computer device having computing capabilities, including but not limited to various desktop computers, notebook computers, smartphones, tablets, Internet of Things devices, and portable wearable devices. The Internet of Things device may be a smart speaker, a smart television, a smart air conditioner, a smart vehicle-mounted device, or the like. The portable wearable device may be a smart watch, a smart bracelet, a head-mounted device, or the like. The server 104 may be an independent physical server, or a server cluster or a distributed system composed of a plurality of physical servers, or may alternatively be a cloud server that provides a cloud service, a cloud database, cloud computing, a cloud function, cloud storage, a network service, cloud communication, a middleware service, a domain name service, a security service, a content delivery network (CDN), and a basic cloud computing service such as big data and an artificial intelligence platform. The terminal and the server may be connected directly or indirectly in a wired or wireless communication manner. These examples are not limiting.

The data transmission method described herein may be implemented based on real-time communication technology, such as the WebRTC. Additionally or alternatively, the data transmission method may be used as a WebRTC SDK integrated into the client to communicate with a standard WebRTC interface. The WebRTC is a real-time communication technology. The WebRTC allows a peer-to-peer connection to be established between a client and a server, or between clients, to implement transmission of video streams and/or audio streams or any other data. The UDP is a connectionless-oriented transmission layer communication protocol, has advantages of fast transmission, high efficiency, and a low delay, and also has disadvantages of unreliability and weak network penetration. The TCP is a connection-oriented, reliable, and byte stream-based transmission layer communication protocol, has advantages of reliable transmission and strong network penetration, and also has disadvantages of slow transmission, low efficiency, and a high delay. The WebRTC generally uses a UDP-based RTP/RTCP transmission protocol, and generally uses a TCP-based reliable transmission protocol, such as http or websocket, to implement signaling interaction in a signaling interaction phase of a WebRTC-based communication session, and uses a UDP-based transmission protocol to establish a connection and perform transmission in a data transmission phase.

Figures 2, 3:
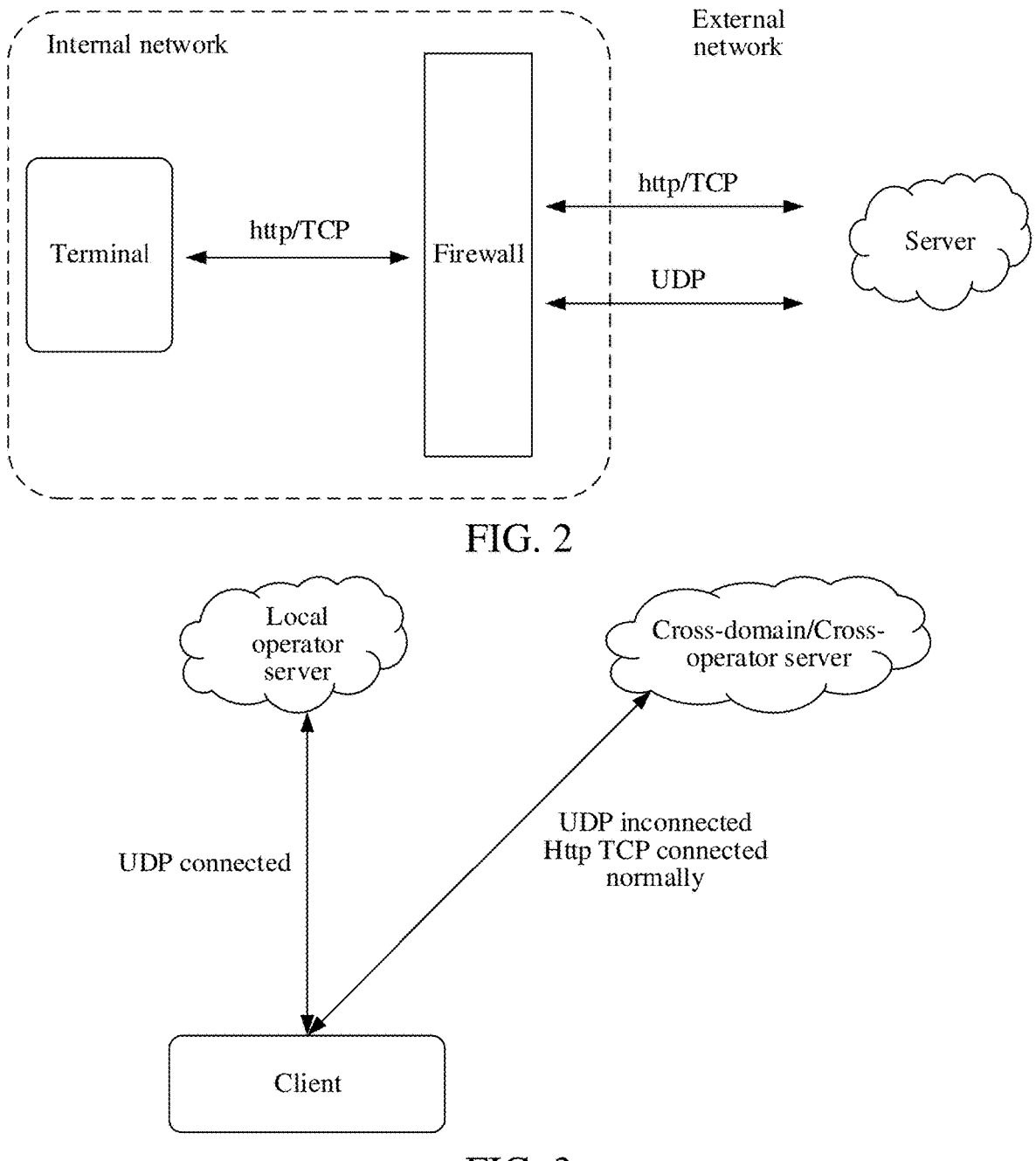
FIG. 2 is a schematic diagram of an example scenario in which UDP is restricted in the related art.
FIG. 3 is a schematic diagram of another example scenario in which UDP is restricted in the related art.

However, the UDP may be restricted in some network environments. For example, FIG. 2 is an example scenario in which the UDP is restricted in the related art. In the scenario, due to a restriction of a firewall security policy of an internal network, there is a high probability that the UDP is blocked by the firewall security policy. The terminal in the internal network may be unable to interact with an external network through the UDP and might only be able to interact with the external network through the TCP. FIG. 3 is another example scenario in which the UDP is restricted in the related art. In this example scenario, due to abnormal client scheduling or heavy load on a local operator server, the client cannot connect to the local operator server, and would directly connect to another cross-domain or cross-operator server. At this time, data transmission using the UDP between the cross-domain or cross-operator is restricted.

In one application scenario, such as a live video scenario, a live video system generally needs to provide a user with a live streaming service of high quality and an ultra-low delay for. This generally includes starting to pull the video stream by using a UDP-based low-delay protocol. However, in the two cases in which the UDP is restricted, transmission failure may result, which directly manifests as a failure to start the live streaming. Currently, a countermeasure used for this scenario is to switch to another protocol for the transmission, for example, switching to a http flv protocol for the transmission when a waiting period times out and the starting of the live streaming fails. However, this method may require a waiting process. In some examples, after a UDP transmission connection times out, switching to http flv streaming may take an excessively long time, and the streaming may start slowly. This causes poor live streaming service experience.

Establishment of the communication session for real-time communication generally includes two phases: a signaling interaction phase and a connection establishment and data transmission phase.

The purpose of the signaling interaction phase is generally for two communication sides to negotiate and learn information about one another, for example, session-related information of the communication session and media-related information of transmitted media data. The media-related information may include the transmission protocol, a transmission address and a port, a codec and another parameter, and the like. Signaling interaction may be implemented based on the session description protocol such as an SDP. The purpose of the session description protocol is generally for exchanging information between two sides in the real-time communication technology. One side uses the SDP to inform the other side of parameters used in the media session. Generally, the SDP serving the WebRTC may be divided into the following two parts: session-level description information, including descriptions about the session and time, and specifically including version information, a session identifier, a session name, session time, and the like; and a media-level part, including descriptions about audio and video media and a network, and specifically including audio and video information, a media type and a parameter, a candidate address and a port for transmitting the media data, a network protocol type and a parameter, an audio and video encoding type and a parameter, and the like.

In the connection establishment and data transmission phase, a connection between one side and the other side may be established based on the session information and media transmission information negotiated in the first phase, and session data transmission may start.

Figures 4, 5, 6:
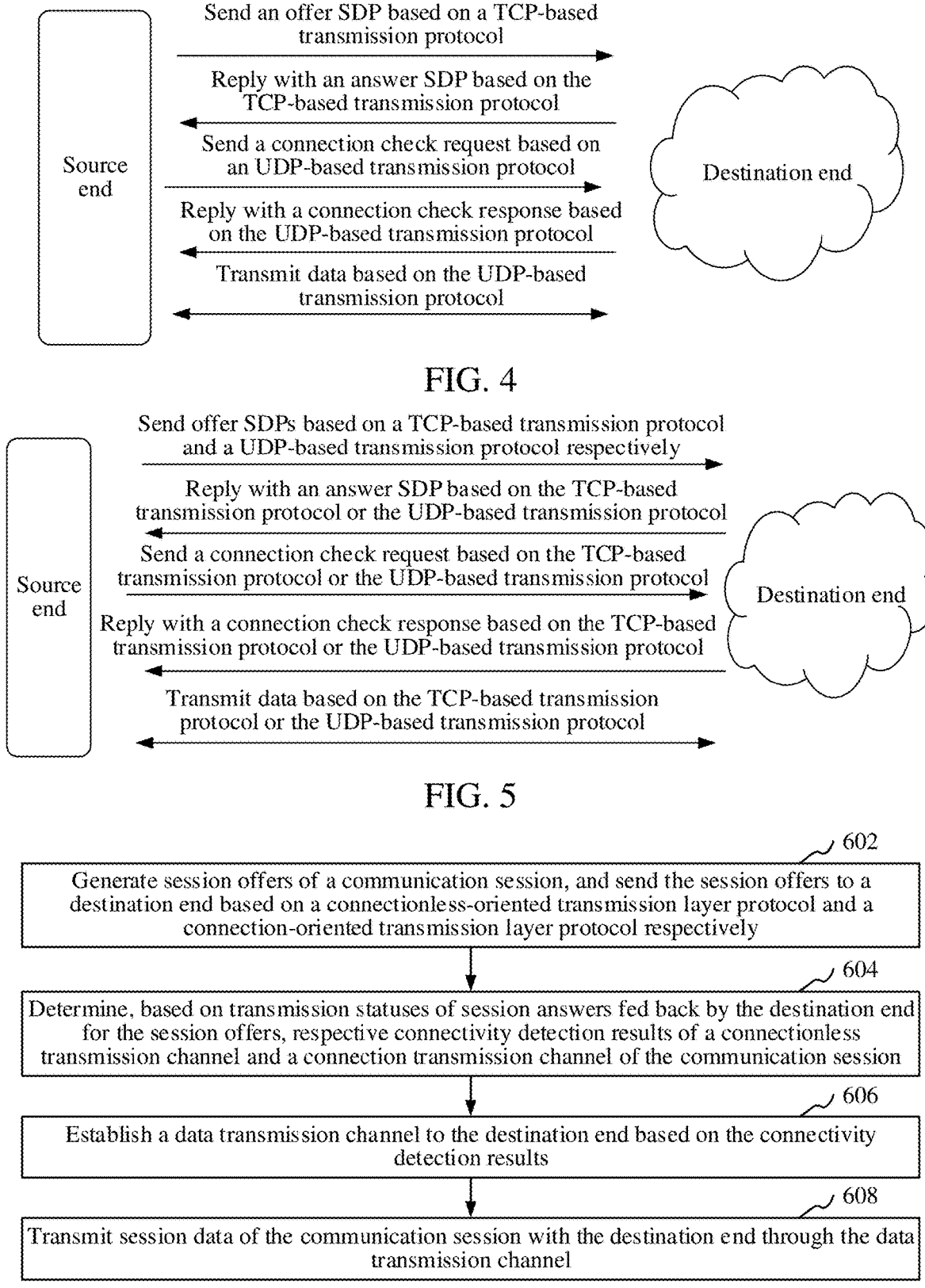
FIG. 4 is an example schematic timing diagram for establishing a real-time communication session in the related art.
FIG. 5 is a schematic timing diagram of an example data transmission method according to one or more aspects described herein.
FIG. 6 is a schematic flowchart of an example data transmission method according to one or more aspects described herein.

FIG. 4 is a schematic diagram of an example process for establishing a data transmission channel of a real-time communication session between a source end and a destination end in the related art. The real-time communication session may be a WebRTC-based real-time communication session. First, the source end may set and store a local SDP, where the SDP includes a candidate address of the source end that may be configured for the data transmission; then, send a session offer SDP including the SDP to the destination end (where in an end-to-end scenario, the offer SDP may be sent to the destination end by using a signaling server; and in an end-to-server scenario, the offer SDP may be directly sent to the server). After obtaining the session offer, the destination end may store the candidate address of the source end, and trigger the setting and storage of the local SDP, where the SDP includes a candidate address of the destination end for the data transmission. The destination end may create a session answer SDP, and send the candidate address of the destination end that is configured for the data transmission to the source end (where in the end-to-end scenario, the answer SDP may be sent to the source end by using the signaling server; and in the end-to-server scenario, the answer SDP may be directly sent to the server), to implement candidate address exchange. Then, the source end may form at least one candidate address combination by using the candidate addresses of the source end and the destination end; initiate a connection check request Stun Binding Request based on a candidate address combination having the highest priority; and record a connection status of the candidate address combination based on a connection check response Stun Binding Response of the destination end. If the connection status is a ready-to-send state, data may be transmitted between the source end and the destination end by using a data transmission channel formed based on the candidate address combination. If the destination end does not feed back the session answer or the destination end does not feed back the connection check response, the data may need to be retransmitted until a timeout period expires. Switching to another transmission protocol might only be considered after expiration of the timeout period.

As shown in FIG. 4, in a standard WebRTC interaction process, the session offer SDP and the session answer SDP in the signaling interaction phase may be sent by using the TCP-based transmission protocol. The data transmission in the connection establishment and data transmission phase may be sent by using the UDP-based transmission protocol. However, in some scenarios as described above, the UDP may be restricted or cannot be used. Because it may be impossible to know in advance whether the UDP can be used, a success rate of the signaling interaction may be low, switching to another protocol after a timeout period may take an excessively long time, and the service quality of low-delay data transmission may be poor.

FIG. 5 is a schematic diagram of an example data transmission method according to aspects described herein. Refer to FIG. 5. A source end may set and store a local SDP, where an SDP includes a candidate address of the source end that is configured for data transmission, and send session offers (also referred to as offer SDPs) including the SDP to a destination end by using a UDP-based transmission protocol and a TCP-based transmission protocol respectively. If the destination end obtains the two session offers, the destination end may store the candidate address of the source end, and trigger the setting and storage of the local SDP, where the SDP includes a candidate address of the destination end for the data transmission. The destination end may create a session answer (also referred to as an answer SDP), and send the candidate address of the destination end that is configured for the data transmission to the source end by using the UDP-based transmission protocol and the TCP-based transmission protocol respectively, to implement candidate address exchange. If the source end receives the answer SDP, a transmission channel based on the corresponding transmission protocol may be in a connected state. Then, the source end may directly form at least one candidate address combination based on the candidate addresses of the source end and the destination end and the related transmission protocol; initiate a connection check request Stun Binding Request based on a candidate address combination having the highest priority by using the related transmission protocol (the TCP or the UDP) corresponding to the combination; and record the connection status of the candidate address combination based on a connection check response Stun Binding Response of the destination end. If the connection status of the candidate address combination is a ready-to-send state, data may be transmitted between the source end and the destination end by using a UDP-based or TCP-based data transmission channel formed based on the candidate address combination.

In comparison with a case in which the interaction signaling is transmitted by using the TCP in the signaling interaction phase shown in FIG. 4, the interaction process provided in FIG. 5 uses the connectionless-oriented transmission layer protocol and the connection-oriented transmission layer protocol, in the signaling interaction phase of the source end and the destination end, to complement each other. By using duel-channel signaling interaction of the connectionless transmission channel and the connection transmission channel, connectivity detection of both the connectionless transmission channel and the connection transmission channel may be implemented to improve a success rate of the signaling interaction. Therefore, the source end may directly and seamlessly determine a protocol to choose to establish the connection to the destination end based on the detection results directly, without waiting, and with low data transmission delay.

In the data transmission method described herein, the source end may generate the session offers of the communication session; send the session offers to the destination end based on the connectionless-oriented transmission layer protocol and the connection-oriented transmission layer protocol respectively; and determine, based on transmission statuses of session answers fed back by the destination end for the session offers, respective connectivity detection results of the connectionless transmission channel and the connection transmission channel of the communication session. In this way, the connectionless transmission channel and the connection transmission channel can be adaptively selected based on the connectivity detection results directly, to seamlessly establish the connection to the destination end. Therefore, in the data transmission phase, the session data of the communication session may be transmitted with the destination end based on the established data transmission channel. In the entire process, there is no need to establish the connection in another manner after a timeout period expires. Connectivity detection of the two types of channel may be directly implemented during signaling interaction. This greatly reduces the data transmission delay, and improves the service experience.

As shown in FIG. 6, an example data transmission method is provided. That the method is applied to the terminal 102 in FIG. 1 is used as an example for description, and the method may include the following operations:

Operation 602: Generate session offers of a communication session, and send the session offers to a destination end based on a connectionless-oriented transmission layer protocol and a connection-oriented transmission layer protocol respectively.

This process relates to a source end and the destination end. The source end may be a side that initiates the session offer, and the destination end may be a side that feeds back a session answer. After a data transmission channel is successfully established between the source end and the destination end, session data may be sent to the destination end from the source end, and data may also be sent to the source end from the destination end. The source end and the destination end may be a client and a server, namely, in an end-to-server scenario. The source end and the destination end may alternatively be a client and a client, namely, in an end-to-end scenario. Generally, before the source end and the destination end transmit the data, or before the data transmission channel is established, the communication session between the source end and the destination end further needs to be established. The communication session may have a session identifier representing interaction of the session data between the source end and the destination end.

The session offer may be an instruction that is initiated by the source end and that indicates session description information of the source end, and may be specifically an offer initiated by the source end. The offer may carry a source end SDP, referred to as an offer SDP. Similarly, the session answer may be an instruction that is fed back by the destination end and that indicates session description information of the destination end, and may be specifically an answer fed back by the source end. The answer may carry a destination end SDP, referred to as an answer SDP. The SDP may be configured for exchanging information between two sides in the real-time communication technology. One side may use the SDP to inform the other side of parameters used in a media session. In one example of an end-to-server scenario, a terminal may pull a media stream from a server by using a client. The terminal may create a communication session in response to a trigger operation of pulling the media stream from the server, obtain session description information of the communication session, and generate session offers of the communication session based on the session description information. In one example of an end-to-end scenario, a terminal serving as the source end may request a server to forward the generated session offers to a peer end by using the server. After receiving the session offers, the peer end may generate corresponding session answers, and request the server to forward the generated session answers to the source end by using the server.

In one arrangement, the method may be applied to a WebRTC structure. In the end-to-end scenario, a terminal serving as the source end may set a local SDP by invoking peerConnection.addIceCandidate in the standard WebRTC structure; set a local SDP for a peerConnection object of the source end; and create the session offer SDP including the local SDP by invoking a peerConnection.createOffer manner. After successfully creating the session offer SDP, the source end may send the session offer SDP to the server, and request the server to forward the session offer SDP to the destination end. After receiving the session offer SDP, the destination end may invoke peerConnection.setRemoteDescription to store the SDP of the source end; assign the SDP of the source end to a peerConnection object of the destination end; then invoke peerConnection.addIceCandidate to obtain the local SDP of the destination end; store the local SDP of the destination end to the peerConnection object of the destination end; and invoke peerConnection.createAnswer to create a session answer SDP. After successfully creating session answer SDP, the destination end may send the session answer SDP to the server, and request the server to forward the session answer SDP to the source end. The source end may invoke the peerConnection.setRemoteDescription to store the SDP of the destination end, and assign the SDP of the destination end to the peerConnection object of the source end. Therefore, SDP information interaction between the source end and the destination end may be implemented. The SDP may include data transmission candidate addresses used by both the source end and the destination end, to implement the candidate address exchange. The peerConnection objects of the source end and the destination end may each include candidate address information of the source end and the destination end, and may be used for the subsequent connection check.

In one example of the end-to-server scenario, a terminal serving as the source end may set a local session description information SDP by invoking a standard WebRTC interface peerConnection.addIceCandidate. Because the terminal is directly connected to the server, and the terminal may request data or upload data from the server, the session description information SDP might not include candidate address information configured for the data transmission of the terminal. The terminal may invoke a peerConnection.createOffer manner to create an offer SDP including the local SDP. After successfully creating the offer SDP, the terminal may send the offer SDP to the server. The server may invoke setRemoteDescription to store the SDP of the source end; then invoke the peerConnection.addIceCandidate to obtain a local SDP of the server; store the local SDP of the destination end; create answer signaling including the SDP; and send the answer SDP to the terminal. The terminal may invoke the setRemoteDescription to store the SDP of the server. The terminal may obtain the destination end candidate address configured for the data transmission from the SDP of the server. This may also implement the candidate address exchange.

The following is an example.

The source end candidate addresses are:

UDP: 192.168.1.100:60001, 172.168.40.6:60002; and

TCP: 192.168.1.100:60003, 172.168.40.6:60004.

The destination end candidate addresses are:

UDP: 183.60.131.113:8000, 183.60.131.112:8080 and

TCP: 183.60.131.113:8080, 183.60.131.114:8080.

If the source end does not receive the answer UDP fed back by the destination end, the source end may determine that the UDP-based transmission channel cannot be connected. Then, the source end may directly generate four TCP-based candidate address combinations, which are as follows in descending order of priorities:

192.168.1.100:60003, and 183.60.131.113:8080;

172.168.40.6:60004, and 183.60.131.113:8080;

192.168.1.100:60003, and 183.60.131.114:8080; and 172.168.40.6:60004, and 183.60.131.114:8080.

The source end may perform connection check in sequence based on the priorities. When the connection status is ready-to-send, an address combination for the data transmission may be obtained. The source end does not need to wait for the UDP connection to time out before considering switching the transmission protocol. This reduces a delay of waiting during the data transmission.

According to one or more aspects described herein, the connection-oriented transmission layer protocol might not only mean the TCP, and may alternatively be another TCP-based transmission protocol, such as a hyper text transfer protocol (HTTP, a simple request-response protocol that generally runs on the TCP), or a WebSocket (a protocol for full-duplex communication over a single TCP connection). The connectionless-oriented transmission layer protocol might not only mean the UDP, and may alternatively be another UDP-based transmission protocol, such as a quick UDP internet connection (QUIC, a UDP-based and low delay internet transmission layer protocol), or a secure reliable transport (SRT, a secure reliable transport, SRT for short, an UDP protocol-based open source internet transmission protocol). Various arrangements are described herein, with the TCP and the UDP being used as particular examples.

In one arrangement, for ease of transmission, the terminal may further compress the session offers, to obtain binary data. Therefore, the session offers may be compressed into the binary data within one MTU (generally 1200 bytes). Then, the binary data obtained through compression may be sent to the destination end based on the connectionless-oriented transmission layer protocol and the connection-oriented transmission layer protocol respectively. A compression manner is not limited to this example.

In one example, the terminal may encapsulate the session offer into first interaction signaling based on the connectionless-oriented transmission layer protocol; encapsulate the session offer into second interaction signaling based on the connection-oriented transmission layer protocol; send the first interaction signaling to the destination end by using the connectionless-oriented transmission layer protocol; and send the second interaction signaling to the destination end by using the connection-oriented transmission layer protocol. Further, in some arrangements, the terminal may generate the corresponding first interaction signaling based on the binary data corresponding to the session offer, and generate the corresponding second interaction signaling based on the binary data corresponding to the session offer.

Operation 604: Determine, based on transmission statuses of the session answers fed back by the destination end for the session offers, respective connectivity detection results of the connectionless transmission channel and the connection transmission channel of the communication session.

The source end may send the session offers by using the connectionless-oriented transmission layer protocol and the connection-oriented transmission layer protocol respectively. When the connectionless transmission channel from the source end to the destination end is in a connected state, the destination end may receive the session offers. When the connection transmission channel from the source end to the destination end is in the connected state, the destination end may receive the session offers. Otherwise, the destination end might not be able to receive the session offers or might only be able to receive one session offer.

When the destination end receives the session offer transmitted by the source end by using the connectionless-oriented transmission layer protocol, the destination end may feed back the corresponding session answer by using the connectionless-oriented transmission layer protocol. When the destination end receives the session offer sent by the source end by using the connection-oriented transmission layer protocol, the destination end may feed back the corresponding session answer by using the connection-oriented transmission layer protocol.

When the connectionless transmission channel from the destination end to the source end is in the connected state, the source end may receive the session answer. When the connection transmission channel from the destination end to the source end is in the connected state, the source end may receive the session answer. Otherwise, the source end might not be able to receive the session answers or might only be able to receive one session answer.

Therefore, if the source end can receive the session answers fed back by the destination end by using the connectionless-oriented transmission layer protocol, both the connectionless transmission channel from the source end to the destination end and the connectionless transmission channel from the destination end to the source end may be in the connected state. To be specific, the connectionless transmission channel between the source end and the destination end may be in the connected state. If the source end can receive the session answers fed back by the destination end by using the connection-oriented transmission layer protocol, both the connection transmission channel from the source end to the destination end and the connection transmission channel from the destination end to the source end may be in the connected state. To be specific, the connection transmission channel between the source end and the destination end may be in the connected state.

Therefore, the transmission statuses of the session answers fed back by the destination end for the session offers may include four types: no session answer fed back by the destination end is received; only the session answer fed back by the destination end by using the connectionless-oriented transmission layer protocol is received; only the session answer fed back by the destination end by using the connection-oriented transmission layer protocol is received; or the session answer fed back by the destination end by using the connectionless-oriented transmission layer protocol and the session answer fed back by the destination end by using the connection-oriented transmission layer protocol are received (where there may be a sequence). Based on the four different transmission statuses, the terminal serving as the source end may determine the respective connectivity detection results of the connectionless transmission channel and the connection transmission channel of the communication session, to be specific: both the connectionless transmission channel and the connection transmission channel of the communication session are in a connectionless state; only the connectionless transmission channel of the communication session is in the connected state; only the connection transmission channel of the communication session is in the connected state; or both the connectionless transmission channel and the connection transmission channel of the communication session are in the connected state.

In the signaling interaction phase of the source end and the destination end, the connectionless-oriented transmission layer protocol and the connection-oriented transmission layer protocol may be used to complement each other with respective advantages and disadvantages, and by using dual-channel signaling interaction of the connectionless transmission channel and the connection transmission channel, the connectivity detection of both the connectionless transmission channel and the connection transmission channel can be directly implemented to improve a success rate of the signaling interaction. Subsequently, the terminal may directly initiate the corresponding connection check based on the detection result, without having to consider switching the transmission protocol after the connection times out.

In one example, if the terminal only receives the session answer fed back by the destination end for the first interaction signaling by using the connectionless-oriented transmission layer protocol, the terminal may store a destination end candidate address that is used to transmit the session data and that is in the session answer, and determine that the connectionless transmission channel of the communication session is in the connected state. Specifically, the terminal may invoke peerConnection.setRemoteDescription to store the destination end candidate address in the session answer of the destination end, and assign the destination end candidate address to a peerConnection object of the source end, where the peerConnection object is configured for generating a candidate address combination subsequently. Because the session answer is fed back by using the connectionless-oriented transmission layer protocol, the candidate address in the session answer may be a network address that may be used by the connectionless transmission channel of the communication session.

In one arrangement, if the terminal only receives the session answer fed back by the destination end for the second interaction signaling by using the connection-oriented transmission layer protocol, the terminal may store a destination end candidate address that is used to transmit the session data and that is in the session answer, and determine that the connection transmission channel of the communication session is in the connected state. Specifically, the terminal may invoke peerConnection.setRemoteDescription to store the destination end candidate address in the session answer of the destination end, and assign the destination end candidate address to the peerConnection object of the source end, where the peerConnection object is configured for generating the candidate address combination subsequently. Because the session answer is fed back by using the connection-oriented transmission layer protocol, the candidate address in the session answer may be a network address that may be used by the connection transmission channel of the communication session.

In one arrangement, if the terminal receives a session answer fed back by the destination end for the first interaction signaling by using the connectionless-oriented transmission layer protocol, and further receives the session answer fed back by the destination end for the second interaction signaling by using the connection-oriented transmission layer protocol, the terminal may store the destination end candidate addresses that are used to transmit the session data and that are in the two session answers, and determine that both the connectionless transmission channel and the connection transmission channel of the communication session are in the connected state. Specifically, if the terminal first receives one session answer, the terminal may invoke peerConnection.setRemoteDescription to store the candidate address in the session answer. Then, if the terminal receives remote candidate address information sent by the destination end again, the terminal may directly invoke peerConnection.addIceCandidate to store the candidate address information, and assign the newly received candidate address to the peerConnection object of the source end.

If the destination end receives the binary data obtained through compression, the destination end might need to decompress the binary data first, to obtain the corresponding session offer. Similarity, for ease of transmission, the destination end may also compress the generated session answers, to obtain corresponding binary data, and then feed back the session answers by using the connectionless-oriented transmission layer protocol and the connection-oriented transmission layer protocol respectively. In this case, the source end may also need to decompress the received binary data, to obtain the corresponding session answers.

Operation 606: Establish the data transmission channel to the destination end based on the connectivity detection results.

Specifically, after obtaining the connectivity detection results, the terminal may determine in advance a channel in the connectionless transmission channel and the connection transmission channel that can successfully establish the connection, and adaptively select one channel to establish the connection as needed.

Before establishing the connection, the terminal may further perform the connection check based on the candidate address combination, to determine a final path for transmitting the session data. In the foregoing signaling interaction phase, the terminal may obtain the candidate addresses respectively corresponding to the local and the destination end. The terminal may combine these candidate addresses, to obtain at least one candidate address combination, and prioritize these candidate address combinations. The priority may be determined based on parameters such as an address type and a media type. For example, considering factors such as a delay, a bandwidth resource, and a packet loss, a host-type candidate address may generally have a higher priority. Each candidate address combination may be configured to transmit the session data of the communication session. The terminal may first initiate, based on priorities of theses candidate address combinations, a connection check request to the destination end for a candidate address combination having the highest priority. If a connection check response fed back by the destination end can be received, the candidate address combination may be connected, and both the source end and the destination end may use the candidate address combination to transmit the session data. Otherwise, if the connection check response fed back by the destination end cannot be received, or feedback of the connection check response times out, the source end may obtain a next candidate address combination, and initiate a connection check request for the next candidate address combination. In this way, a final path and a channel for transmitting the session data can be determined.

In one example, if the connectionless transmission channel of the communication session is in the connected state, a connection check request of the candidate address combination may be initiated based on a candidate address combination formed by a first address in the source end candidate address and a second address in the destination end candidate address; and when a connection check response fed back by the destination end in response to the connection check request is received, a connectionless-oriented data transmission channel may be established with the destination end based on the candidate address combination.

In one arrangement, if the connection transmission channel of the communication session is in the connected state, a connection check request of the candidate address combination may be initiated based on a candidate address combination formed by a first address in the source end candidate address and a second address in the destination end candidate address; and when a connection check response fed back by the destination end in response to the connection check request is received, a connection-oriented data transmission channel may be established with the destination end based on the candidate address combination.

In one arrangement, if both the connectionless transmission channel and the connection transmission channel of the communication session are in the connected state, the terminal may select one channel to establish the data transmission channel based on the situation. Generally, because the connectionless transmission channel has a lower delay, the session data may be transmitted first by establishing the connectionless transmission channel. The terminal may alternatively select the channel based on a time sequence of receiving the session answers, round-trip time, transmission quality (that is determined based on a frame rate and a transmission quality parameter in the SDP), and the like of the two channels. For example, when the transmission quality of the connectionless transmission channel is poor, the connection transmission channel may still be selected to be established to transmit the session data.

Operation 608: Transmit the session data of the communication session with the destination end through the data transmission channel.

After the data transmission channel between the source end and the destination end is successfully established, the session data of the communication session, such as a live media stream to be pulled for the communication session, may be transmitted between the source end and the destination end.

Figure 7:
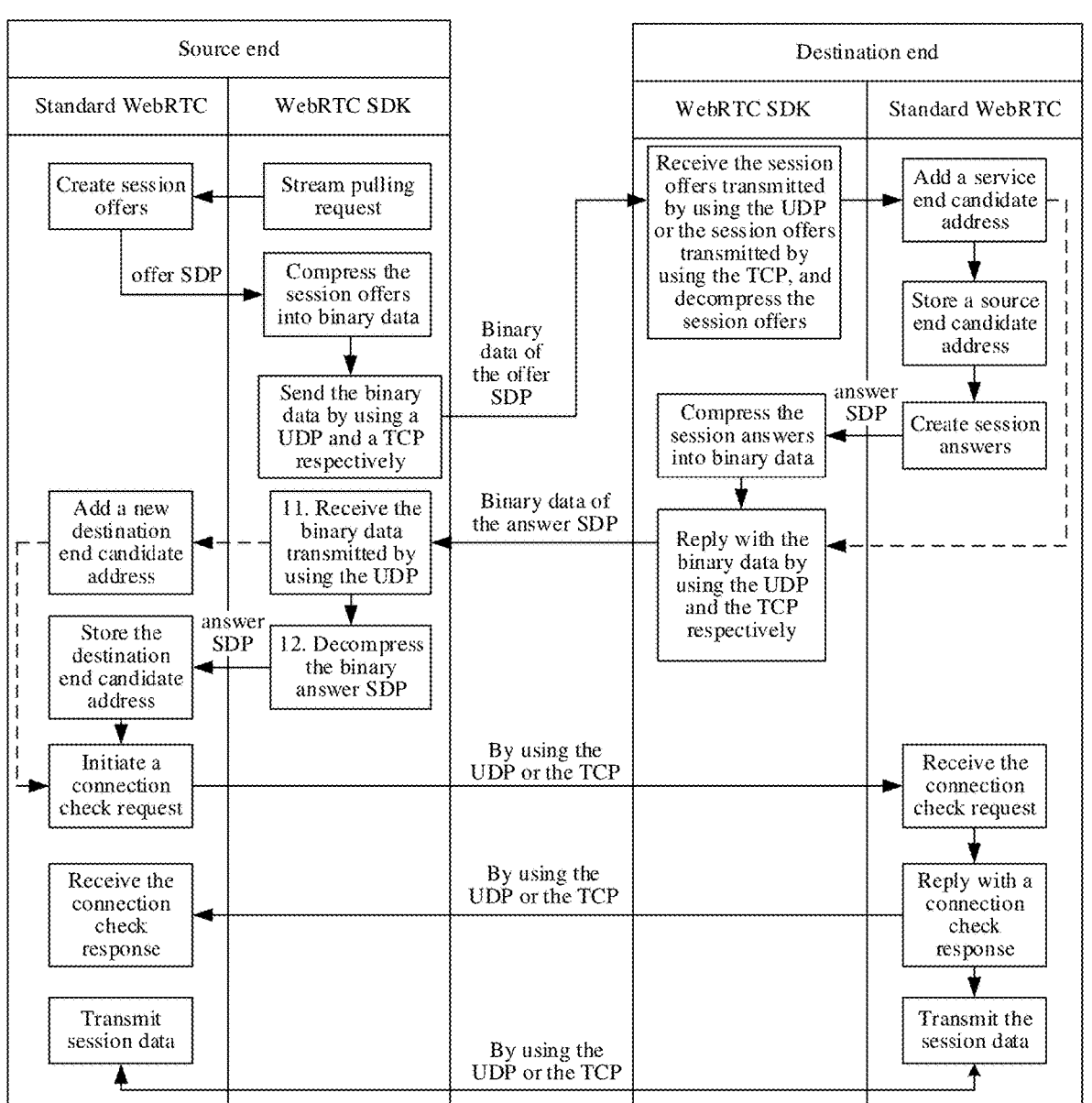
FIG. 7 is a schematic flowchart of an example data transmission method according to one or more aspects described herein.

FIG. 7 is a schematic flowchart of an example data transmission method =. The data transmission method is described in detail from a source end and a destination end. A client may serve as the source end, and a server may serve as the destination end. The source end may include a standard WebRTC structure and a WebRTC SDK may be integrated in the client. In addition, the destination end may include the standard WebRTC structure and the WebRTC SDK may be integrated into the client. The method may be implemented by using the WebRTC SDK.

In one example, in the source end, a pulling request may be received by using the WebRTC SDK. A standard interface peerConnection.addIceCandidate of the WebRTC structure may be triggered to be invoked to set a local SDP. Based on the SDP, the standard interface peerConnection.addIceCandidate of the WebRTC structure may be invoked to create a session offer SDP. After the session offer is successfully created, for ease of transmission, the session offer SDP may be compressed into binary data. The binary data may be transmitted to a server side in both a UDP manner and a TCP manner respectively (where UDP transmission may use a pure UDP, or another UDP-based protocol, such as a QUIC and an SRT, and TCP transmission may use a pure TCP to obtain another TCP-based protocol such as an HTTP and a WebSocket).

Then, the WebRTC SDK of the destination end may create session answers based on an arrival situation of the binary data sent by the source end. If the binary data transmitted by using the UDP is received, the WebRTC SDK may invoke a peerConnection.addIceCandidate to add a server UDP candidate address, decompresses the received binary data to obtain the offer SDP, and then invoke peerConnection.setRemoteDescription to store the UDP candidate address of the source end. In addition, the destination end may further invoke a peerConnection.createAnswer based on the server UDP candidate address to create a session answer SDP, and perform binary compression to obtain the binary data, where the binary data is replied to the source end by using the UDP.

If the binary data transmitted by using the TCP is received, the WebRTC SDK may invoke a peerConnection.addIceCandidate to add a server TCP candidate address, decompress the received binary data to obtain the offer SDP, and then invoke peerConnection.setRemoteDescription to store the TCP candidate address of the source end. In addition, the destination end may further invoke a peerConnection.create Answer based on the server TCP candidate address to create a session answer SDP, and perform binary compression to obtain the binary data, where the binary data is replied to the source end by using the TCP.

If in a destination end side, reception of the binary data sent by the source end is later than sending of an answer SDP, the two pieces of the binary data may be received one after the other. In this case, the WebRTC SDK of the destination end side may directly invoke a peerConnection.addIceCandidate to add a later received candidate address, and send the candidate address separately to the source end.

Examples of candidates of the UDP and the TCP are as follows, where the candidate addresses may be sent to the source end by using the answer SDP or may be directly sent to the source end separately:

a=candidate:1 1 UDP 2130806431 183.60.131.113 8000 typ host; and a=candidate:2 1 TCP 2111832063 183.60.131.113 8080 typ host tcptype active The first is the UDP candidate address, and the second is the TCP candidate address.

After receiving the binary data of the answer SDP, the source end may decompress and restore the answer SDP; invoke the peerConnection.setRemoteDescription based on a destination end candidate address to store the SDP of the destination end; assign the SDP of the destination end to a peerConnection object of the source end; and trigger a combination formed by the candidate address of the source end and the destination end in the peerConnection object based on a standard WebRTC to initiate a connection check.

If the source end further separately receives the destination end candidate address sent by the destination end subsequently, the source end may invoke the peerConnection.addIceCandidate to set a new destination end candidate address to the standard WebRTC. The standard WebRTC may initiate the connection check to the new destination end candidate address. After the connection check passes, the server may adaptively select any one of the connections for the data transmission based on transmission statuses.

In one arrangement, the data transmission method may be executed by a computer device in which the source end is located, and includes the following operations:

creating the communication session in response to a trigger operation of pulling a media stream from the server;

obtaining session description information of the communication session;

generating the session offers of the communication session based on the session description information;

compressing the session offers, to obtain the binary data;

encapsulating the session offer into first interaction signaling based on a connectionless-oriented transmission layer protocol;

encapsulating the session offer into second interaction signaling based on a connection-oriented transmission layer protocol;

sending the first interaction signaling to the destination end by using the connectionless-oriented transmission layer protocol, and sending the second interaction signaling to the destination end by using the connection-oriented transmission layer protocol;

if only a session answer fed back by the destination end for the first interaction signaling by using the connectionless-oriented transmission layer protocol is received, storing the destination end candidate address that is used to transmit the session data and that is in the session answer, and determining that the connectionless transmission channel of the communication session is in a connected state; or if only a session answer fed back by the destination end for the second interaction signaling by using the connection-oriented transmission layer protocol is received, storing the destination end candidate address that is used to transmit the session data and that is in the session answer, and determining that the connection transmission channel of the communication session is in a connected state;

after receiving the session answer fed back by the destination end for the first interaction signaling by using the connectionless-oriented transmission layer protocol, and storing the destination end candidate address that is used to transmit the session data and that is in the session answer, if receiving a candidate address fed back by the destination end for the second interaction signaling by using the connection-oriented transmission layer protocol, storing the fed back candidate address, and determining that both the connectionless transmission channel and the connection transmission channel of the communication session are in the connected state;

if the connectionless transmission channel of the communication session is in the connected state, initiating, based on the candidate address combination formed by a first address in the source end candidate address and a second address in the destination end candidate address, the connection check request of the candidate address combination; and when receiving the connection check response fed back by the destination end in response to the connection check request, establishing the connectionless-oriented data transmission channel with the destination end based on the candidate address combination; or if the connection transmission channel of the communication session is in the connected state, initiating, based on the candidate address combination formed by the first address in the source end candidate address and the second address in the destination end candidate address, the connection check request of the candidate address combination; and when receiving the connection check response fed back by the destination end in response to the connection check request, establishing the connection-oriented data transmission channel with the destination end based on the candidate address combination; or if both the connectionless transmission channel and the connection transmission channel of the communication session are in the connected state, adaptively selecting one to establish the data transmission channel based on respective transmission quality; and transmitting the session data of the communication session with the destination end through the data transmission channel.

The data transmission method uses respective advantages and disadvantages of the UDP and the TCP for complementation, to implement a UDP connectivity detection and a TCP connectivity detection by using UDP and TCP dual-channel signaling interaction; and establish a connection through a WebRTC adaptive selection of the UDP channel or the TCP channel to transmit media data. This improves service quality of a WebRTC-based service, and solves a transmission failure problem caused when the UDP cannot communicate (e.g., when the signaling interaction is successful but the data transmission cannot establish the connection), or a problem of a long delay caused by switching to another transmission protocol after a waiting period times out. This may complement disadvantages of only depending on the UDP for the data transmission, improve a service quality QoS indicator and product technology completeness, and improve product experience.

In one or more examples, a data transmission method may be applied to an application environment shown in FIG. 1. A terminal 102 communicates with a server 104 by using a network. A data storage system may store data that the server 104 needs to process. The data storage system may be integrated on the server 104, or placed on a cloud or another server. In one arrangements, the server 104 serving as a destination end, receives, in sequence, session offers of a communication session sent by the terminal 102 serving as a source end based on a connectionless-oriented transmission layer protocol and a connection-oriented transmission layer protocol respectively; collects the source end candidate addresses that are used to transmit session data and that are in the session offers; generates session answers in response to the session offers based on the destination end candidate address; reply the source end with the session answer based on the connectionless-oriented transmission layer protocol and the connection-oriented transmission layer protocol respectively; establishes a data transmission channel between the destination end and the source end based on the source end candidate address and the destination end candidate address; and transmits the session data of the communication session to the source end through the data transmission channel.

In one example, as shown in FIG. 8, a data transmission method is provided and executed by a computer device in which a destination end is located. That the method is applied to the server 104 in FIG. 1 serving as the computer device in which the destination end is located is used as an example for description. Reference may be made to the foregoing description for example operations of the data transmission method. In some arrangements, the method may include the following operations:

Operation 802: Receive, in sequence, session offers of a communication session transmitted by a source end based on a connectionless-oriented transmission layer protocol and a connection-oriented transmission layer protocol respectively.

The source end may send the session offers by using the connectionless-oriented transmission layer protocol and the connection-oriented transmission layer protocol respectively. When the connectionless transmission channel from the source end to the destination end is in a connected state, the destination end may receive the session offers. When the connection transmission channel from the source end to the destination end is in the connected state, the destination end may receive the session offers. Otherwise, the destination end might not be able to receive the session offers or might only be able to receive one session offer. That the destination end receives the two types of the session offers in various arrangements is used as an example for description.

Operation 804: Collect source end candidate addresses that are used to transmit session data and that are in the session offers.

Operation 806: Generate session answers in response to the session offers based on destination end candidate addresses.

Operation 808: Reply the source end with the session answers based on the connectionless-oriented transmission layer protocol and the connection-oriented transmission layer protocol respectively, and establish a data transmission channel to the source end based on the source end candidate address and the destination end candidate address.

After receiving the session offer SDP, the server serving as the destination end may invoke peerConnection.setRemoteDescription to store an SDP of the source end; assign the SDP of the source end to a peerConnection object of the destination end; then invoke the peerConnection.addIceCandidate to obtain a local SDP of the destination end; store the local SDP of the destination end to the peerConnection object of the destination end; and invoke peerConnection.createAnswer to create the session answer SDP.

After successfully creating the session answer, the server may send the session answer to the terminal.

When the destination end receives the session offer transmitted by the source end by using the connectionless-oriented transmission layer protocol, the destination end may feed back the corresponding session answer by using the connectionless-oriented transmission layer protocol. When the destination end receives the session offer sent by the source end by using the connection-oriented transmission layer protocol, the destination end may feed back the corresponding session answer by using the connection-oriented transmission layer protocol.

When the connectionless transmission channel from the destination end to the source end is in the connected state, the source end may receive the session answer. When the connection transmission channel from the destination end to the source end is in the connected state, the source end may receive the session answer. Otherwise, the source end might not be able to receive the session answers or might only be able to receive one session answer.

If the source end can receive the session answers fed back by the destination end by using the connectionless-oriented transmission layer protocol, both the connectionless transmission channel from the source end to the destination end and the connectionless transmission channel from the destination end to the source end may be in the connected state. To be specific, the connectionless transmission channel between the source end and the destination end may be in the connected state. If the source end can receive the session answers fed back by the destination end by using the connection-oriented transmission layer protocol, both the connection transmission channel from the source end to the destination end and the connection transmission channel from the destination end to the source end may be in the connected state. To be specific, the connection transmission channel between the source end and the destination end may be in the connected state.

Therefore, the transmission statuses of the session answers fed back by the destination end for the session offers may include four types: no session answer fed back by the destination end is received; only the session answer fed back by the destination end by using the connectionless-oriented transmission layer protocol is received; only the session answer fed back by the destination end by using the connection-oriented transmission layer protocol is received; or the session answer fed back by the destination end by using the connectionless-oriented transmission layer protocol and the session answer fed back by the destination end by using the connection-oriented transmission layer protocol are received (where there may be a sequence). Based on the four different transmission statuses, the terminal serving as the source end may determine the respective connectivity detection results of the connectionless transmission channel and the connection transmission channel of the communication session, to be specific: both the connectionless transmission channel and the connection transmission channel of the communication session are in a connectionless state; only the connectionless transmission channel of the communication session is in the connected state; only the connection transmission channel of the communication session is in the connected state; or both the connectionless transmission channel and the connection transmission channel of the communication session are in the connected state.

Operation 810: Transmit the session data of the communication session with the source end through the data transmission channel.

In one example, the server serving as the destination end may receive, in sequence, binary data of the communication session sent by the source end based on the connectionless-oriented transmission layer protocol and the connection-oriented transmission layer protocol respectively, where the binary data is compressed session offers; and compress the binary data, to obtain the session offers of the communication session.

In one arrangement, for case of transmission, the source end may further compress the session offers, to obtain the binary data. Therefore, the session offers may be compressed into the binary data within one MTU (generally 1200 bytes). Then, the binary data obtained through compression may be sent to the destination end based on the connectionless-oriented transmission layer protocol and the connection-oriented transmission layer protocol respectively. After receiving the binary data, the destination end may decompress the binary data, and store the session offers.

In one arrangement, based on the connectionless-oriented transmission layer protocol and the connection-oriented transmission layer protocol respectively, the session answers replies to the source end may include: compressing the session answers, to obtain the binary data; and sending the binary data to the source end based on the connectionless-oriented transmission layer protocol and the connection-oriented transmission layer protocol respectively.

For case of transmission, the destination end may also compress the generated session answers, to obtain corresponding binary data, and then feed back the session answers by using the connectionless-oriented transmission layer protocol and the connection-oriented transmission layer protocol respectively. In this case, the source end may also need to decompress the received binary data, to obtain the corresponding session answers.

In one arrangement, based on the connectionless-oriented transmission layer protocol and the connection-oriented transmission layer protocol respectively, the session answers replies to the source end may include: encapsulating the session answer into third interaction signaling based on the connectionless-oriented transmission layer protocol; encapsulating the session answer into fourth interaction signaling based on the connection-oriented transmission layer protocol; sending the third interaction signaling to the source end by using the connectionless-oriented transmission layer protocol, and sending the fourth interaction signaling to the source end by using the connection-oriented transmission layer protocol.

Before establishing the connection, the terminal may further perform the connection check based on the candidate address combination, to determine a final path for transmitting the session data. In the foregoing signaling interaction phase, the terminal obtains the candidate addresses respectively corresponding to the local and the destination end. The terminal may combine these candidate addresses, to obtain at least one candidate address combination, and prioritize these candidate address combinations. The priority may be determined based on parameters such as an address type and a media type. For example, considering factors such as a delay, a bandwidth resource, and a packet loss, a host-type candidate address generally has a higher priority. Each candidate address combination may be configured to transmit the session data of the communication session. The terminal first initiates, based on priorities of theses candidate address combinations, a connection check request to the destination end for a candidate address combination having the highest priority. If a connection check response fed back by the destination end can be received, the candidate address combination may be connected, and both the source end and the destination end may use the candidate address combination to transmit the session data. Otherwise, if the connection check response fed back by the destination end cannot be received, or feedback of the connection check response times out, the source end may obtain a next candidate address combination, and initiate a connection check request for the next candidate address combination. In this way, a final path and a channel for transmitting the session data can be determined.

In one arrangement, based on the source end candidate address and the destination end candidate address, establishing a data transmission channel to the source end may include: receiving the connection check request initiated by the source end based on the first address in the source end candidate address and the second address in the destination end candidate address; and when it is checked that the first address and the second address belong to a candidate address combination of the communication session, feeding back a connection check response to the source end, to determine a data transmission channel that is to the source end and that is formed by the first address and the second address. When the first address and the second address both are a connection-oriented transmission candidate address, the data transmission channel may be a connection-oriented data transmission channel. When the first address and the second address both are a connectionless-oriented transmission candidate address, the data transmission channel may be a connectionless-oriented data transmission channel.

The data transmission method is described in one example from a perspective of both the source end and the destination end, and may include the following operations:

The source end may create the communication session in responses to a trigger operation of pulling a media stream from the server; obtain session description information of the communication session; generate the session offers of the communication session based on the session description information; and compress the session offers, to obtain the binary data.

The source end may transmit the binary data to the destination end based on the connectionless-oriented transmission layer protocol and the connection-oriented transmission layer protocol respectively.

If receiving the binary data transmitted by using the connectionless-oriented transmission layer protocol, the destination end may decompress the data to obtain the session offer transmitted by using the connectionless-oriented transmission layer protocol; obtain the connectionless-oriented source end candidate address of the source end from the session offer; store the connectionless destination end candidate address set by the destination end; create the session answers based on the destination end candidate address; and feed back the session answer to the source end by using the connectionless-oriented transmission layer protocol; or if receiving the binary data transmitted by using the connection-oriented transmission layer protocol, the destination end may decompress the data to obtain the session offer transmitted by using the connection-oriented transmission layer protocol; obtain the connection-oriented source end candidate address of the source end from the session offer; store the connection destination end candidate address set by the destination end; create the session answers based on the destination end candidate address; and feed back the session answer to the source end by using the connection-oriented transmission layer protocol.

If receiving only a session answer fed back by the destination end by using the connectionless-oriented transmission layer protocol, the source end may store the destination end candidate address that is used to transmit the session data and that is in the session answer, and determine that the connectionless transmission channel of the communication session is in a connected state; or if receiving only a session answer fed back by the destination end by using the connection-oriented transmission layer protocol, the source end may store the destination end candidate address that is used to transmit the session data and that is in the session answer, and determine that the connection transmission channel of the communication session is in a connected state.

After receiving the session answer fed back by the destination end by using the connectionless-oriented transmission layer protocol, and storing the destination end candidate address that is used to transmit the session data and that is in the session answer, if receiving a candidate address fed back by the destination end by using the connection-oriented transmission layer protocol, the source end may store the fed back candidate address, and determine that both the connectionless transmission channel and the connection transmission channel of the communication session are in the connected state.

If the connectionless transmission channel of the communication session is in the connected state, the source end may initiate, based on the candidate address combination formed by the first address in the source end candidate address and the second address in the destination end candidate address, the connection check request of the candidate address combination; and when receiving a connection check response fed back by the destination end in response to the connection check request, establish the connectionless-oriented data transmission channel with the destination end based on the candidate address combination; or if the connection transmission channel of the communication session is in the connected state, the source end may initiate, based on the candidate address combination formed by the first address in the source end candidate address and the second address in the destination end candidate address, the connection check request of the candidate address combination; and when receiving the connection check response fed back by the destination end in response to the connection check request, establish the connection-oriented data transmission channel with the destination end based on the candidate address combination.

The session data of the communication session may be transmitted between the source end and the destination end through the data transmission channel.

The data transmission method, in a signaling interaction phase of the source end and the destination end, may use the connectionless-oriented transmission layer protocol and the connection-oriented transmission layer protocol to complement each other with respective advantages and disadvantages. By using dual-channel signaling interaction of the connectionless transmission channel and the connection transmission channel, connectivity detection of both the connectionless transmission channel and the connection transmission channel is implemented to improve a success rate of the signaling interaction. Specifically, when receiving the session offers of the communication session sent by the source end based on the connectionless-oriented transmission layer protocol and the connection-oriented transmission layer protocol respectively, the destination end may collect the source end candidate addresses that are used to transmit the session data and that are in the two session offers; generate the session answers in response to the session offers based on a local destination end candidate address; and reply the source end with the session answers by using the connectionless-oriented transmission layer protocol and the connection-oriented transmission layer protocol respectively. Therefore, the source end may determine the respective connectivity detection results of the connectionless transmission channel and the connection transmission channel of the communication session based on the transmission statuses of the session answer; adaptively select one channel to establish the data transmission channel based on the connectivity detection results, the source end candidate address and the destination end candidate address; and transmit, in a data transmission phase, the session data of the communication session to the destination end based on the established data transmission channel. In the entire process, the source end does not need to try to establish the connection in another manner when a timeout period expires, but may directly complete the connectivity detection of the two types during signaling interaction. This greatly reduces a data transmission delay, and improves service experience.

Although the operations in the example flowcharts are shown in sequences indicated by the arrows, the operations are not necessarily required to be executed in those sequences. Unless explicitly described, there is no strict sequence restriction on the execution of the operations, and the operations can be executed in other sequences. In addition, at least some of the operations in the flowcharts may include a plurality of operations or phases. The operations or phases are not necessarily executed at the same time, but may be executed at different times. The execution sequence of the operations or phases is not necessarily in sequence, but may be executed in turn or alternately with another operation or at least part of the operation or phases in another operation.

Aspects described herein further provide a data transmission apparatus for implementing the data transmission method. The implementation solution provided by the apparatus to solve the problem is similar to the implementation solution recorded in the foregoing method. Therefore, for specific descriptions of the one or more data transmission apparatus examples provided below, refer to descriptions of the foregoing data transmission method.

In one example, as shown in FIG. 9, a data transmission apparatus 900 is provided, including a session offer sending module 902, a connectivity detection module 904, a connection establishment module 906, and a transmission module 908.

The session offer sending module 902 may be configured to: generate session offers of a communication session, and transmit the session offers to a destination end based on a connectionless-oriented transmission layer protocol and a connection-oriented transmission layer protocol respectively.

The connectivity detection module 904 may be configured to: determine, based on transmission statuses of session answers fed back by the destination end for the session offers, respective connectivity detection results of a connectionless transmission channel and a connection transmission channel of the communication session.

The connection establishment module 906 may be configured to: establish a data transmission channel to the destination end based on the connectivity detection results.

The transmission module 908 may be configured to transmit session data of the communication session with the destination end through the data transmission channel.

In one or more arrangements, the session offer sending module 902 may be further configured to: create the communication session in responses to a trigger operation of pulling a media stream from a server; obtain session description information of the communication session; and generate the session offers of the communication session based on the session description information.

In one or more arrangements, the session offer sending module 902 may be further configured to: compress the session offers, to obtain binary data; and transmit the binary data to the destination end based on the connectionless-oriented transmission layer protocol and the connection-oriented transmission layer protocol respectively.

In one or more arrangements, the session offer sending module 902 may be further configured to: encapsulate the session offer into first interaction signaling based on the connectionless-oriented transmission layer protocol; encapsulate the session offer into second interaction signaling based on the connection-oriented transmission layer protocol; send the first interaction signaling to the destination end by using the connectionless-oriented transmission layer protocol; and send the second interaction signaling to the destination end by using the connection-oriented transmission layer protocol.

In one or more arrangements, the connectivity detection module 904 may be further configured to: if only a session answer fed back by the destination end for the first interaction signaling by using the connectionless-oriented transmission layer protocol is received, store the destination end candidate address that is used to transmit the session data and that is in the session answer, and determine that the connectionless transmission channel of the communication session is in a connected state; if only a session answer fed back by the destination end for the second interaction signaling by using the connection-oriented transmission layer protocol is received, store a destination end candidate address that is used to transmit the session data and that is in the session answer, and determine that the connection transmission channel of the communication session is in a connected state.

In one or more arrangements, the connection establishment module 906 may be further configured to: if the connectionless transmission channel of the communication session is in the connected state, initiate, based on the candidate address combination formed by a first address in the source end candidate address and a second address in the destination end candidate address, the connection check request of the candidate address combination; and when receiving the connection check response fed back by the destination end in response to the connection check request, establish the connectionless-oriented data transmission channel with the destination end based on the candidate address combination.

In one or more arrangements, the connection establishment module 906 may be further configured to: if the connection transmission channel of the communication session is in the connected state, initiate, based on the candidate address combination formed by the first address in the source end candidate address and the second address in the destination end candidate address, the connection check request of the candidate address combination; and when receiving the connection check response fed back by the destination end in response to the connection check request, establish the connection-oriented data transmission channel with the destination end based on the candidate address combination.

In one or more arrangements, the connectivity detection module may be is further configured to: after receiving the session answer fed back by the destination end for the first interaction signaling by using the connectionless-oriented transmission layer protocol, and storing the destination end candidate address that is used to transmit the session data and that is in the session answer, if receiving a candidate address fed back by the destination end for the second interaction signaling by using the connection-oriented transmission layer protocol, store the fed back candidate address; and determine that both the connectionless transmission channel and the connection transmission channel of the communication session are in a connected state.

The data transmission apparatus 900, in a signaling interaction phase of the source end and the destination end, may use the connectionless-oriented transmission layer protocol and the connection-oriented transmission layer protocol to complement each other with respective advantages and disadvantages. By using dual-channel signaling interaction of the connectionless transmission channel and the connection transmission channel, connectivity detection of both the connectionless transmission channel and the connection transmission channel is implemented to improve a success rate of the signaling interaction. Specifically, the source end may generate the session offers of the communication session; send the session offers to the destination end based on the connectionless-oriented transmission layer protocol and the connection-oriented transmission layer protocol respectively; and determine, based on transmission statuses of session answers fed back by the destination end for the session offers, respective connectivity detection results of the connectionless transmission channel and the connection transmission channel of the communication session. In this way, the connectionless transmission channel and the connection transmission channel can be adaptively selected based on the connectivity detection results directly, to seamlessly establish the connection to the destination end. Therefore, in the data transmission phase, the session data of the communication session may be transmitted with the destination end based on the established data transmission channel. In the entire process, there might be no need to establish the connection in another manner after expiration of a timeout period. Connectivity detection of the two types may be directly implemented during signaling interaction. This greatly reduces the data transmission delay, and improves the service experience.

All or a part of each module of the transmission apparatus 900 may be implemented by using software, hardware, and a combination of the software and the hardware thereof. Each module may be embedded in or independent of the processor of the computer device in a form of the hardware, or may be stored in the memory of the computer device in a form of the software, to enable the processor to execute operations corresponding to the modules.

Figure 10:
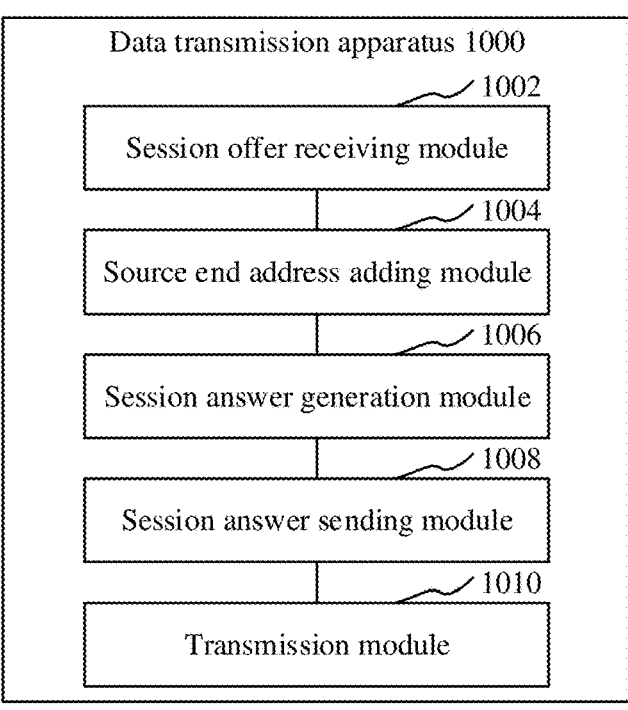
FIG. 10 is a structural block diagram of an example data transmission apparatus according to one or more aspects described herein.

In one or more arrangements, as shown in FIG. 10, a data transmission apparatus 1000 is provided, including a session offer receiving module 1002, a source end address adding module 1004, a session answer generation module 1006, a session answer sending module 1008, and a transmission module 1010.

The session offer receiving module 1002 may be config-ured to: receive, in sequence, session offers of a communi-cation session transmitted by a source end based on a connectionless-oriented transmission layer protocol and a connection-oriented transmission layer protocol respec-tively.

The source end address adding module 1004 may be configured to collect source end candidate addresses that are used to transmit session data and that are in the session offers.

The session answer generation module 1006 may be configured to generate session answers in response to the session offers based on destination end candidate addresses.

The session answer sending module 1008 may be con-figured to: reply the source end with the session answers based on the connectionless-oriented transmission layer protocol and the connection-oriented transmission layer protocol respectively, and establish a data transmission channel to the source end based on the source end candidate address and the destination end candidate address.

The transmission module 1010 may be configured to transmit session data of the communication session with the source end through the data transmission channel.

In one or more arrangements, the session offer receiving module 1002 may be further configured to: receive, in sequence, binary data of the communication session trans-mitted by the source end based on the connectionless-oriented transmission layer protocol and the connection-oriented transmission layer protocol respectively, where binary data is compressed session offers; and compress the binary data, to obtain the session offers of the communica-tion session.

In one or more arrangements, the session answer sending module 1008 may be further configured to: compress the session answers, to obtain binary data; and transmit the binary data to the source end based on the connectionless-oriented transmission layer protocol and the connection-oriented transmission layer protocol respectively.

In one or more arrangements, the session answer sending module 1008 may be further configured to: encapsulate the session answer into third interaction signaling based on the connectionless-oriented transmission layer protocol; encap-sulate the session answer into fourth interaction signaling based on the connection-oriented transmission layer proto-col; send the third interaction signaling to the destination end by using the connectionless-oriented transmission layer protocol; and send the fourth interaction signaling to the source end by using the connection-oriented transmission layer protocol.

In one or more arrangements, the apparatus may further include a connection establishment module, configured to: receive the connection check request initiated by the source end based on the first address in the source end candidate address and the second address in the destination end candidate address; and when it is checked that the first address and the second address belong to a candidate address combination of the communication session, feed back a connection check response to the source end, to determine a data transmission channel that is to the source end and that is formed by the first address and the second address.

The data transmission apparatus 1000, in a signaling interaction phase of the source end and the destination end, may use the connectionless-oriented transmission layer pro-tocol and the connection-oriented transmission layer proto-col to complement each other with respective advantages and disadvantages. By using dual-channel signaling inter-action of the connectionless transmission channel and the connection transmission channel, connectivity detection of both the connectionless transmission channel and the connection transmission channel is implemented to improve a success rate of the signaling interaction. Specifically, when receiving the session offers of the communication session sent by the source end based on the connectionless-oriented transmission layer protocol and the connection-oriented transmission layer protocol respectively, the destination end may collect the source end candidate addresses that are used to transmit the session data and that are in the two session offers; generate the session answers in response to the session offers based on a local destination end candidate address; and reply to the source end with the session answers by using the connectionless-oriented transmission layer protocol and the connection-oriented transmission layer protocol respectively. Therefore, the source end may determine the respective connectivity detection results of the connectionless transmission channel and the connection transmission channel of the communication session based on the transmission statuses of the session answer; adaptively select one channel to establish the data transmission channel based on the connectivity detection results, the source end candidate address and the destination end candidate address; and transmit, in a data transmission phase, the session data of the communication session to the destination end based on the established data transmission channel. In the entire process, the source end might not need to try to establish the connection in another manner when waiting times out, but directly completes the connectivity detection of the two types during signaling interaction. This greatly reduces a data transmission delay, and improves service experience.

All or a part of each module of the transmission apparatus 1000 may be implemented by using software, hardware, and a combination of the software and the hardware thereof. Each module may be embedded in or independent of the processor of the computer device in a form of the hardware, or may be stored in the memory of the computer device in a form of the software, to enable the processor to execute operations corresponding to the modules.

In one example, a computer device is provided. The computer device may be the server 104 in FIG. 1, and an internal structure may be shown in FIG. 11. The computer device includes a processor, a memory, an input/output (I/O for short) interface, and a communication interface. The processor, the memory, and the input/output interface are connected through a system bus. The communication interface is connected to the system bus through the input/output interface. The processor of the computer device is configured to provide a computing and control capability. The memory of the computer device includes a non-volatile storage media and an internal memory. The non-volatile storage media stores an operating system, computer-readable instructions, and a database. The internal memory provides an environment for execution of the operating system and the computer-readable instructions in the non-volatile storage media. The database of the computer device is configured to store session data, such as media resource data. The input/output interface of the computer device is configured to exchange information between the processor and an external device. The communication interface of the computer device is configured to connect and communicate with an external terminal through a network. When the computer-readable instructions are executed by the processor, a data transmission method is implemented.

Figure 12:
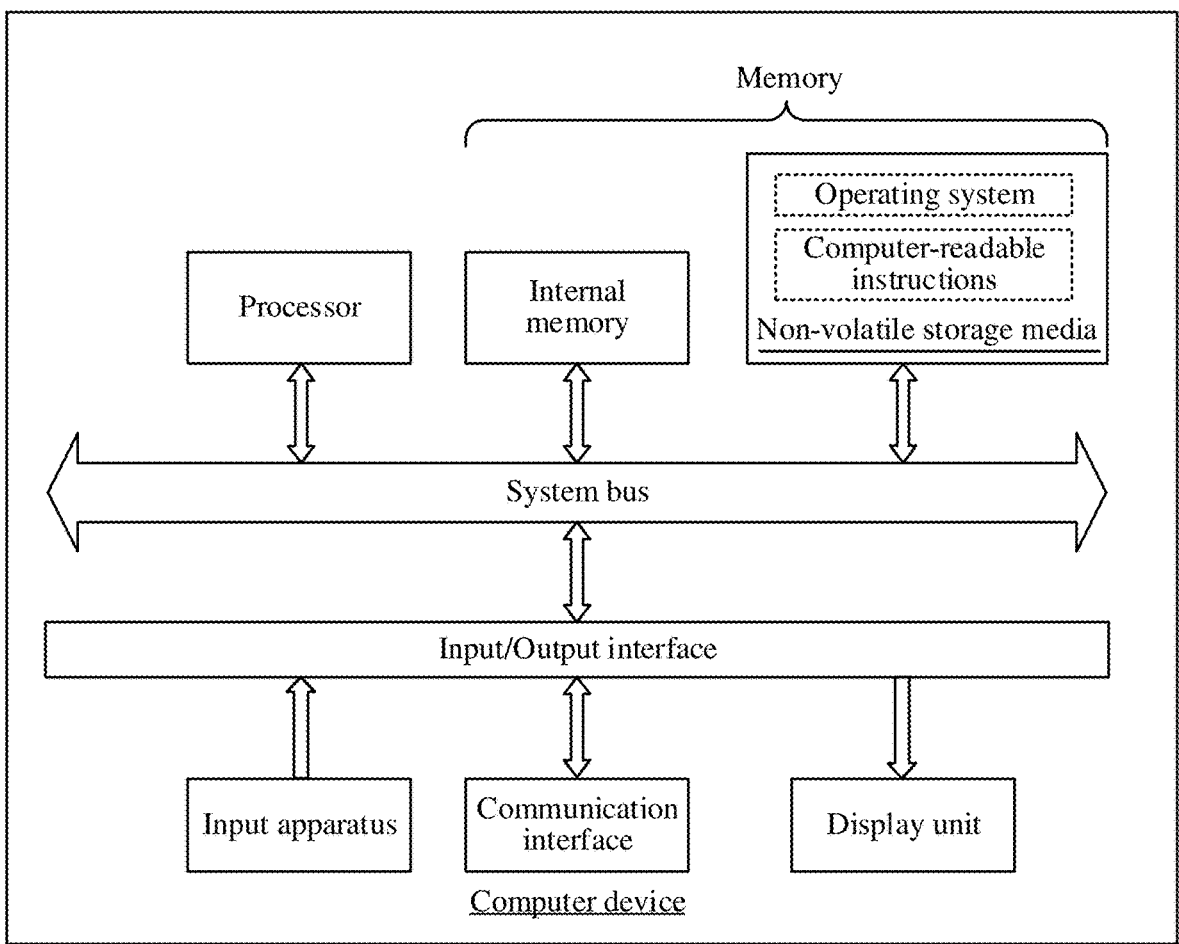
FIG. 12 is an internal structural diagram of an example computer device according to another embodiment.

In another example, a computer device may be the terminal 102 in FIG. 1, and an internal structure may be shown in FIG. 12. The computer device includes a processor, a memory, an input/output interface, a communication interface, a display unit and an input apparatus. The processor, the memory, and the input/output interface are connected through a system bus. The communication interface, the display unit and the input apparatus are connected to the system bus through the input/output interface. The processor of the computer device is configured to provide a computing and control capability. The memory of the computer device includes a non-volatile storage media and an internal memory. The non-volatile storage media stores an operating system and computer-readable instructions. The internal memory provides an environment for execution of the operating system and the computer-readable instructions in the non-volatile storage media. The input/output interface of the computer device is configured to exchange information between the processor and an external device. The communication interface of the computer device is configured to communication with an external terminal in a wired or wireless manner. The wireless manner may be implemented through Wi-Fi, a mobile cellular network, near field communication (NFC) or another technology. When the computer-readable instructions are executed by the processor, a data transmission method is implemented. The display unit of the computer device is configured to form a visually visible picture and may be a display screen, a projection device or a virtual reality imaging device. The display screen may be a liquid crystal display or an electronic ink display. The input device of the computer device may be a touch layer covered on the display screen, or may also be a button, a trackball or a touch pad provided on a computer device shell, or may alternatively be an external keyboard, a touch pad or a mouse.

Figure 11:
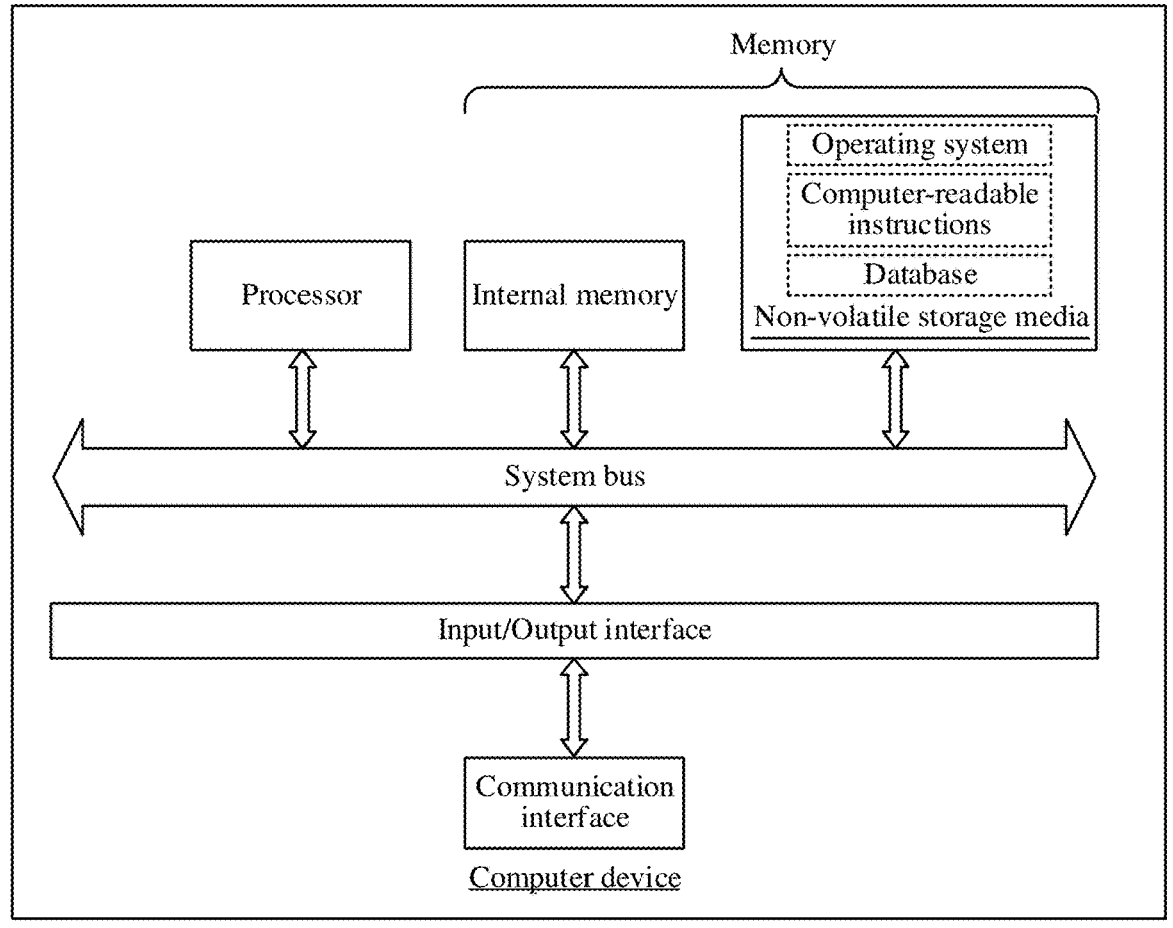
FIG. 11 is an internal structural diagram of an example computer device according to one or more aspects described herein.

The structures shown in FIG. 11 and FIG. 12 are merely block diagrams of some structures related to solutions of this application, and is not intended to limit the computer device to which the solutions described herein may be applied. A specific computer device may include more or fewer components than those shown in the figure, or some components may be combined, or a different component deployment may be used.

According to one or more aspects, a computer device is provided, including a memory and a processor. The memory stores computer-readable instructions. When the computer-readable instructions are executed by the processor, operations of the data transmission method described by the foregoing one or more embodiments are implemented.

According to further aspects, a computer-readable storage medium is provided, having computer-readable instructions stored therein. When the computer-readable instructions are executed by the processor, operations of the data transmission method described by the foregoing one or more embodiments are implemented.

According to other aspects, a computer program product is provided, including computer-readable instructions. When the computer-readable instructions are executed by the processor, operations of the data transmission method described by the foregoing one or more embodiments are implemented.

User information (including but not limited to user equipment information, user personal information, and the like) and data (including but not limited to data used for analysis, stored data, displayed data, and the like) described herein may include information and data authorized by the user or fully authorized by all parties, and the collection, use and processing of relevant data need to comply with the related laws, regulations and standards of related countries and regions.

All or some of the processes of the methods described herein may be implemented by indicating related hardware through computer-readable instructions. The computer-readable instructions may be stored in a non-volatile computer-readable storage medium. When the computer-readable instructions are executed, the computer-readable instructions may include the processes of the foregoing methods. Any reference to the memory, the database or another media used in embodiments provided by this application may include at least one of the non-volatile memory and the volatile memory. The non-volatile memory can include a read-only memory (ROM), a magnetic tape, a floppy disk, a flash memory, an optical memory, a high-density embedded non-volatile memory, a resistive random access memory (ReRAM), a magnetoresistive random access memory (MRAM), a ferroelectric random access memory (FRAM), a phasechange memory (PCM), a graphene memory, and the like. The volatile memory may include a random access memory (RAM), an external cache memory, or the like. For description and not a limitation, the RAM may be in various forms, such as a static random access memory (SRAM), or a dynamic random access memory (DRAM). Databases according to aspects described herein may include at least one of a relational database and a non-relational database. The non-relational databases may include a blockchain-based distributed databases, and the like. These examples are not limiting. The processors may be a general-purpose processor, a central processing unit, a graphics processor, a digital signal processor, a programmable logic device, a quantum computing-based data processing logic device, and the like. These examples are not limiting.

Technical features of foregoing embodiments may be combined in different manners to form other embodiments. For ease of description, not all possible combinations of the technical features in embodiments are described. However, as long as there is no contradiction in the combinations of these technical features, it is to be considered to be within the scope of this application.

The foregoing description is specific and detailed, but is not to be understood as limiting on the scope of the invention. A person of ordinary skill in the art can make improvements and refinements without departing from the concepts provided herein, and the modifications and improvements shall fall within the scope of this disclosure.

What is claimed is:

1. A data transmission method for real-time communications over a computer network, executed by a computer device, and the method comprising:

generating session offers of a network communication session;

transmitting the session offers to a destination end based on a connectionless-oriented transmission layer protocol and a connection-oriented transmission layer protocol respectively, the transmitting including:

encapsulating the session offer into first interaction signaling based on the connectionless-oriented transmission layer protocol;

encapsulating the session offer into second interaction signaling based on the connection-oriented transmission layer protocol; and transmitting the first interaction signaling to the destination end by using the connectionless-oriented transmission layer protocol, and transmitting the second interaction signaling to the destination end by using the connection-oriented transmission layer protocol;

determining, based on transmission statuses of session answers fed back by the destination end responsive to the session offers, respective connectivity detection results of a connectionless transmission channel and a connection transmission channel of the communication session, wherein the determining includes:

determining that a session answer fed back by the destination end for the first interaction signaling is only received through the connectionless-oriented transmission layer protocol, and responsive to the determining that a session answer fed back by the destination end for the first interaction signaling is only received through the connectionless-oriented transmission layer protocol, storing a destination end candidate address that is used to transmit session data and that is in the session answer, and determining that the connectionless transmission channel of the communication session is in a connected state; or determining that a session answer fed back by the destination end for the second interaction signaling is only received through the connection-oriented transmission layer protocol, and responsive to the determining that a session answer fed back by the destination end for the second interaction signaling is only received through the connection-oriented transmission layer protocol, storing a destination end candidate address that is used to transmit the session data and that is in the session answer, and determining that the connection transmission channel of the communication session is in a connected state;

establishing a data transmission channel to the destination end based on the connectivity detection results; and transmitting the session data of the communication session with the destination end through the data transmission channel.

2. The method according to claim 1, wherein the generating session offers of a communication session comprises:

creating the communication session in response to a trigger operation of pulling a media stream from a server;

obtaining session description information of the communication session; and generating the session offers of the communication session based on the session description information.

3. The method according to claim 1, wherein the transmitting the session offers to a destination end based on a connectionless-oriented transmission layer protocol and a connection-oriented transmission layer protocol respectively comprises:

compressing the session offers to obtain binary data; and transmitting the binary data to the destination end based on the connectionless-oriented transmission layer protocol and the connection-oriented transmission layer protocol respectively.

4. The method according to claim 1, wherein the establishing a data transmission channel to the destination end based on the connectivity detection results comprises:

determining that the connectionless transmission channel of the communication session is in the connected state, and responsive to the determining that the connectionless transmission channel of the communication session is in the connected state, initiating, based on a candidate address combination formed by a first address in a source end candidate address and a second address in the destination end candidate address, a connection check request of the candidate address combination; and upon receiving a connection check response fed back by the destination end in response to the connection check request, establishing a connectionless-oriented data transmission channel to the destination end based on the candidate address combination.

5. The method according to claim 1, wherein the establishing a data transmission channel to the destination end based on the connectivity detection results comprises:

determining that the connection transmission channel of the communication session is in the connected state, and responsive to the determining that the connection transmission channel of the communication session is in the connected state, initiating, based on a candidate address combination formed by a first address in a source end candidate address and a second address in the destination end candidate address, a connection check request of the candidate address combination; and upon receiving a connection check response fed back by the destination end in response to the connection check request, establishing a connection-oriented data transmission channel to the destination end based on the candidate address combination.

6. The method according to claim 1, wherein the determining, based on transmission statuses of session answers fed back by the destination end for the session offers, respective connectivity detection results of a connectionless transmission channel and a connection transmission channel of the communication session comprises:

after receiving the session answer fed back by the destination end for the first interaction signaling by using the connectionless-oriented transmission layer protocol, and storing a destination end candidate address that is used to transmit the session data and that is in the session answer:

determining that a candidate address is fed back by the destination end for the second interaction signaling by using the connection-oriented transmission layer protocol; and responsive to the determining that a candidate address is fed back by the destination end for the second interaction signaling by using the connection-oriented transmission layer protocol, storing the fed back candidate address, and determining that both the connectionless transmission channel and the connection transmission channel of the communication session are in a connected state.

7. The method according to claim 1, wherein the session answers are compressed into binary data.

8. The method according to claim 1, wherein the session answer is encapsulated into third interaction signaling based on the connectionless-oriented transmission layer protocol;

the session answer is encapsulated into fourth interaction signaling based on the connection-oriented transmission layer protocol;

wherein the third interaction signaling is received via the connectionless-oriented transmission layer protocol; and wherein the fourth interaction signaling is received via the connection-oriented transmission layer protocol.

9. A data transmission apparatus for real-time communications over a computer network, the data transmission apparatus comprising:

a processor; and memory storing computer-readable instructions that, when executed, cause the data transmission apparatus to:

generate session offers of a communication session;

transmit the session offers to a destination end based on a connectionless-oriented transmission layer protocol and a connection-oriented transmission layer protocol respectively, the transmitting including:

encapsulating the session offer into first interaction signaling based on the connectionless-oriented transmission layer protocol;

encapsulating the session offer into second interaction signaling based on the connection-oriented transmission layer protocol; and transmitting the first interaction signaling to the destination end by using the connectionless-oriented transmission layer protocol, and transmitting the second interaction signaling to the destination end by using the connection-oriented transmission layer protocol;

determine, based on transmission statuses of session answers fed back by the destination end responsive to the session offers, respective connectivity detection results of a connectionless transmission channel and a connection transmission channel of the communication session, wherein the determining includes:

determining that a session answer fed back by the destination end for the first interaction signaling is only received through the connectionless-oriented transmission layer protocol, and responsive to the determining that a session answer fed back by the destination end for the first interaction signaling is only received through the connectionless-oriented transmission layer protocol, storing a destination end candidate address that is used to transmit session data and that is in the session answer, and determining that the connectionless transmission channel of the communication session is in a connected state; or determining that a session answer fed back by the destination end for the second interaction signaling is only received through the connection-oriented transmission layer protocol, and responsive to the determining that a session answer fed back by the destination end for the second interaction signaling is only received through the connection-oriented transmission layer protocol, storing a destination end candidate address that is used to transmit the session data and that is in the session answer, and determining that the connection transmission channel of the communication session is in a connected state;

establish a data transmission channel to the destination end based on the connectivity detection results; and transmit the session data of the communication session with the destination end through the data transmission channel.

10. The data transmission apparatus according to claim 9, wherein the data transmission apparatus is further caused to:

compress the session offers, to obtain binary data; and transmit the binary data to the destination end based on the connectionless-oriented transmission layer protocol and the connection-oriented transmission layer protocol respectively.

11. The data transmission apparatus according to claim 9, wherein the establishing a data transmission channel to the destination end based on the connectivity detection results comprises:

determining that the connectionless transmission channel of the communication session is in the connected state, and responsive to the determining that the connectionless transmission channel of the communication session is in the connected state, initiating, based on a candidate address combination formed by a first address in a source end candidate address and a second address in the destination end candidate address, a connection check request of the candidate address combination; and upon receiving a connection check response fed back by the destination end in response to the connection check request, establishing a connectionless-oriented data transmission channel to the destination end based on the candidate address combination.

12. The data transmission apparatus according to claim 9, wherein the generating session offers of a communication session comprises:

creating the communication session in response to a trigger operation of pulling a media stream from a server;

obtaining session description information of the communication session; and generating the session offers of the communication session based on the session description information.

13. The data transmission apparatus according to claim 9, wherein the establishing a data transmission channel to the destination end based on the connectivity detection results comprises:

determining that the connection transmission channel of the communication session is in the connected state, and responsive to the determining that the connection transmission channel of the communication session is in the connected state, initiating, based on a candidate address combination formed by a first address in a source end candidate address and a second address in the destination end candidate address, a connection check request of the candidate address combination; and upon receiving a connection check response fed back by the destination end in response to the connection check request, establishing a connection-oriented data transmission channel to the destination end based on the candidate address combination.

14. The data transmission apparatus according to claim 9, wherein the determining, based on transmission statuses of session answers fed back by the destination end for the session offers, respective connectivity detection results of a connectionless transmission channel and a connection transmission channel of the communication session comprises:

after receiving the session answer fed back by the destination end for the first interaction signaling by using the connectionless-oriented transmission layer protocol, and storing a destination end candidate address that is used to transmit the session data and that is in the session answer:

determining that a candidate address is fed back by the destination end for the second interaction signaling by using the connection-oriented transmission layer protocol; and responsive to the determining that a candidate address is fed back by the destination end for the second interaction signaling by using the connection-oriented transmission layer protocol, storing the fed back candidate address, and determining that both the connectionless transmission channel and the connection transmission channel of the communication session are in a connected state.

15. The data transmission apparatus according to claim 9, wherein the session answers are compressed into binary data.

16. The data transmission apparatus according to claim 9, wherein the session answer is encapsulated into third interaction signaling based on the connectionless-oriented transmission layer protocol;

the session answer is encapsulated into fourth interaction signaling based on the connection-oriented transmission layer protocol;

wherein the third interaction signaling is received via the connectionless-oriented transmission layer protocol; and wherein the fourth interaction signaling is received via the connection-oriented transmission layer protocol.

17. A non-transitory computer-readable storage medium, having computer-readable instructions stored therein, and the computer-readable instructions, when executed by a processor, implementing a method for providing real-time communication over a computer network, the method comprising:

generating session offers of a network communication session;

transmitting the session offers to a destination end based on a connectionless-oriented transmission layer protocol and a connection-oriented transmission layer protocol respectively, the transmitting including:

encapsulating the session offer into first interaction signaling based on the connectionless-oriented transmission layer protocol;

encapsulating the session offer into second interaction signaling based on the connection-oriented transmission layer protocol; and transmitting the first interaction signaling to the destination end by using the connectionless-oriented transmission layer protocol, and transmitting the second interaction signaling to the destination end by using the connection-oriented transmission layer protocol;

determining, based on transmission statuses of session answers fed back by the destination end responsive to the session offers, respective connectivity detection results of a connectionless transmission channel and a connection transmission channel of the communication session, wherein the determining includes:

determining that a session answer fed back by the destination end for the first interaction signaling is only received through the connectionless-oriented transmission layer protocol, and responsive to the determining that a session answer fed back by the destination end for the first interaction signaling is only received through the connectionless-oriented transmission layer protocol, storing a destination end candidate address that is used to transmit session data and that is in the session answer, and determining that the connectionless transmission channel of the communication session is in a connected state; or determining that a session answer fed back by the destination end for the second interaction signaling is only received through the connection-oriented transmission layer protocol, and responsive to the determining that a session answer fed back by the destination end for the second interaction signaling is only received through the connection-oriented transmission layer protocol, storing a destination end candidate address that is used to transmit the session data and that is in the session answer, and determining that the connection transmission channel of the communication session is in a connected state;

establishing a data transmission channel to the destination end based on the connectivity detection results; and transmitting the session data of the communication session with the destination end through the data transmission channel.

18. The non-transitory computer-readable storage medium according to claim 17, wherein the determining, based on transmission statuses of session answers fed back by the destination end for the session offers, respective connectivity detection results of a connectionless transmission channel and a connection transmission channel of the communication session comprises:

after receiving the session answer fed back by the destination end for the first interaction signaling by using the connectionless-oriented transmission layer protocol, and storing a destination end candidate address that is used to transmit the session data and that is in the session answer:

determining that a candidate address is fed back by the destination end for the second interaction signaling by using the connection-oriented transmission layer protocol; and responsive to the determining that a candidate address is fed back by the destination end for the second interaction signaling by using the connection-oriented transmission layer protocol, storing the fed back candidate address, and determining that both the connectionless transmission channel and the connection transmission channel of the communication session are in a connected state.

19. The non-transitory computer-readable storage medium according to claim 17, wherein the establishing a data transmission channel to the destination end based on the connectivity detection results comprises:

determining that the connection transmission channel of the communication session is in the connected state, and responsive to the determining that the connection transmission channel of the communication session is in the connected state, initiating, based on a candidate address combination formed by a first address in a source end candidate address and a second address in the destination end candidate address, a connection check request of the candidate address combination; and upon receiving a connection check response fed back by the destination end in response to the connection check request, establishing a connection-oriented data transmission channel to the destination end based on the candidate address combination.

20. The non-transitory computer-readable storage medium according to claim 17, wherein the method further comprises: compressing the session offers, to obtain binary data; and transmitting the binary data to the destination end based on the connectionless-oriented transmission layer protocol and the connection-oriented transmission layer protocol respectively.

\*  \*  \*  \*  \*